(12) United States Patent
Fischer

(10) Patent No.: US 9,756,599 B2
(45) Date of Patent: *Sep. 5, 2017

(54) POSITIONING REFERENCE SIGNAL (PRS) GENERATION FOR MULTIPLE TRANSMIT ANTENNA SYSTEMS

(71) Applicant: QUALCOMM Incorporated, San Diego, CA (US)

(72) Inventor: Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,220

(22) Filed: Sep. 30, 2016

(65) Prior Publication Data
US 2017/0019875 A1    Jan. 19, 2017

Related U.S. Application Data

(63) Continuation of application No. 14/921,836, filed on Oct. 23, 2015, now Pat. No. 9,482,742.
(Continued)

(51) Int. Cl.
*H04W 24/00* (2009.01)
*H04W 64/00* (2009.01)
(Continued)

(52) U.S. Cl.
CPC ............ *H04W 64/00* (2013.01); *G01S 1/042* (2013.01); *G01S 1/20* (2013.01); *G01S 5/0226* (2013.01);
(Continued)

(58) Field of Classification Search
CPC ..... H04L 5/0048; H04L 5/001; H04L 5/0053; H04L 27/2613; H04W 64/00;
(Continued)

(56) References Cited

U.S. PATENT DOCUMENTS 5,263,177 A    11/1993    Schieve et al.
6,101,176 A     8/2000    Honkasalo et al.
(Continued)

FOREIGN PATENT DOCUMENTS

CN    1867196 A    11/2006
CN    1902838 A     1/2007
(Continued)

OTHER PUBLICATIONS

3GPP, "3rd Generation Partnership Project; Technical Specification Group Radio Access Network; Coordinated multi-point operation for LTE physical layer aspects (Release 11)", 3GPP TR 36.819 V11.2.0 (Sep. 2013), 70 pages.
(Continued)

*Primary Examiner* — Olumide T Ajibade Akonai
(74) *Attorney, Agent, or Firm* — Silicon Valley Patent Group LLP

(57) ABSTRACT

Disclosed embodiments pertain to a method of generating a Positioning Reference Signal (PRS) sequence for a system comprising a plurality of physical transmitting antenna elements serving a single cell. In some embodiments, the method may comprise: assigning a distinct Physical Antenna Port (PAP) identifier (ID) to a subset of the plurality of physical transmitting antenna elements; and generating PRS sequences for the subset of the plurality of physical transmitting antenna elements, wherein each PRS sequence corresponds to a physical transmitting antenna element in the subset of the plurality of physical transmitting antenna elements, and each PRS sequence has a corresponding frequency shift based, at least in part, on the PAP ID (h) of the corresponding physical transmitting antenna element.

30 Claims, 15 Drawing Sheets

Related U.S. Application Data

(60) Provisional application No. 62/160,442, filed on May 12, 2015.

(51) Int. Cl.
| | |
|---|---|
| *G01S 5/10* | (2006.01) |
| *H04W 4/02* | (2009.01) |
| *H04W 72/04* | (2009.01) |
| *H04L 5/00* | (2006.01) |
| *G01S 5/02* | (2010.01) |
| *G01S 1/04* | (2006.01) |
| *G01S 1/20* | (2006.01) |

(52) U.S. Cl.
CPC .......... *G01S 5/0236* (2013.01); *G01S 5/0263* (2013.01); *G01S 5/10* (2013.01); *H04L 5/00* (2013.01); *H04L 5/0048* (2013.01); *H04W 4/023* (2013.01); *H04W 72/046* (2013.01); *H04W 64/006* (2013.01)

(58) Field of Classification Search
CPC ..... H04W 48/12; H04W 24/10; H04W 48/16; H04W 64/006; H04W 72/04; H04W 4/023; G01S 5/10; G01S 1/20; G01S 5/0226; H04J 11/0079
See application file for complete search history.

(56) References Cited

U.S. PATENT DOCUMENTS

| | | | |
|---|---|---|---|
| 6,108,558 A | 8/2000 | Vanderspool, II | |
| 6,157,842 A | 12/2000 | Karlsson et al. | |
| 6,415,155 B1 | 7/2002 | Koshima et al. | |
| 6,424,819 B1 | 7/2002 | Yan | |
| 6,498,585 B2 | 12/2002 | Jandrell | |
| 6,501,955 B1 | 12/2002 | Durrant et al. | |
| 6,564,064 B1 | 5/2003 | Ciganer et al. | |
| 6,753,812 B2 | 6/2004 | Rabinowitz et al. | |
| 6,785,321 B1 | 8/2004 | Yang et al. | |
| 6,831,911 B1 | 12/2004 | Sridharan et al. | |
| 6,909,902 B1 | 6/2005 | Sawada et al. | |
| 7,016,688 B2 | 3/2006 | Simic et al. | |
| 7,139,580 B2 | 11/2006 | Stein et al. | |
| 7,881,249 B2 | 2/2011 | Wheatley | |
| 8,493,267 B2 | 7/2013 | Wengler et al. | |
| 8,929,826 B2 | 1/2015 | Siomina et al. | |
| 9,204,418 B2* | 12/2015 | Siomina | H04W 64/00 |
| 9,279,879 B2 | 3/2016 | Khandekar et al. | |
| 9,482,742 B1* | 11/2016 | Fischer | G01S 5/10 |
| 9,651,653 B2 | 5/2017 | Fischer et al. | |
| 2002/0097181 A1 | 7/2002 | Chou et al. | |
| 2003/0008663 A1 | 1/2003 | Stein et al. | |
| 2003/0008664 A1 | 1/2003 | Stein et al. | |
| 2003/0083008 A1 | 5/2003 | Baker et al. | |
| 2004/0176029 A1 | 9/2004 | Soliman | |
| 2004/0219930 A1 | 11/2004 | Lin | |
| 2004/0266338 A1 | 12/2004 | Rowitch | |
| 2005/0130672 A1 | 6/2005 | Dean et al. | |
| 2007/0014252 A1 | 1/2007 | Chung et al. | |
| 2008/0254743 A1 | 10/2008 | Nishikawa et al. | |
| 2009/0053993 A1 | 2/2009 | Baker et al. | |
| 2009/0061899 A1 | 3/2009 | Hwang et al. | |
| 2009/0143018 A1 | 6/2009 | Anderson et al. | |
| 2009/0203386 A1 | 8/2009 | Edge et al. | |
| 2010/0118706 A1 | 5/2010 | Parkvall et al. | |
| 2010/0165882 A1 | 7/2010 | Palanki et al. | |
| 2010/0167743 A1 | 7/2010 | Palanki et al. | |
| 2010/0195566 A1 | 8/2010 | Krishnamurthy et al. | |
| 2010/0260154 A1 | 10/2010 | Frank et al. | |
| 2010/0273506 A1 | 10/2010 | Stern-Berkowitz et al. | |
| 2010/0317351 A1 | 12/2010 | Gerstenberger et al. | |
| 2010/0323718 A1 | 12/2010 | Jen | |
| 2011/0105144 A1 | 5/2011 | Siomina et al. | |
| 2011/0117925 A1 | 5/2011 | Sampath et al. | |
| 2011/0117926 A1 | 5/2011 | Hwang et al. | |
| 2011/0124347 A1 | 5/2011 | Chen et al. | |
| 2011/0149903 A1 | 6/2011 | Krishnamurthy et al. | |
| 2011/0159901 A1 | 6/2011 | Frenger et al. | |
| 2011/0176440 A1 | 7/2011 | Frank et al. | |
| 2012/0027110 A1 | 2/2012 | Han et al. | |
| 2012/0040696 A1 | 2/2012 | Siomina et al. | |
| 2012/0046047 A1 | 2/2012 | Popovic et al. | |
| 2012/0083278 A1 | 4/2012 | Kazmi et al. | |
| 2012/0108270 A1 | 5/2012 | Kazmi et al. | |
| 2012/0189041 A1 | 7/2012 | Ko et al. | |
| 2012/0231809 A1 | 9/2012 | Siomina et al. | |
| 2012/0252487 A1 | 10/2012 | Siomina et al. | |
| 2013/0023285 A1 | 1/2013 | Markhovsky et al. | |
| 2013/0194931 A1 | 8/2013 | Lee et al. | |
| 2014/0087754 A1 | 3/2014 | Siomina et al. | |
| 2014/0176366 A1 | 6/2014 | Fischer et al. | |
| 2014/0286280 A1 | 9/2014 | Seo et al. | |
| 2015/0016239 A1 | 1/2015 | Yi et al. | |
| 2015/0195770 A1* | 7/2015 | Sun | H04J 1/08 370/330 |
| 2015/0198696 A1* | 7/2015 | Liu | H04W 64/00 370/329 |
| 2015/0282114 A1 | 10/2015 | Zhao et al. | |
| 2016/0192317 A1 | 6/2016 | Khandekar et al. | |
| 2016/0195601 A1 | 7/2016 | Siomina et al. | |

FOREIGN PATENT DOCUMENTS

| | | |
|---|---|---|
| EP | 0930514 A2 | 7/1999 |
| EP | 1742080 A1 | 1/2007 |
| JP | 2002101445 | 4/2002 |
| JP | 2003035762 A | 2/2003 |
| JP | 2004108903 A | 4/2004 |
| JP | 2006325218 A | 11/2006 |
| JP | 2007537613 A | 12/2007 |
| JP | 2012530394 A | 11/2012 |
| TW | 201116112 A | 5/2011 |
| TW | 201235688 A | 9/2012 |
| WO | 0051392 | 8/2000 |
| WO | WO-02087275 | 10/2002 |
| WO | WO-2004077698 A1 | 9/2004 |
| WO | WO-2004079387 A2 | 9/2004 |
| WO | WO-2004080105 A2 | 9/2004 |
| WO | WO-2004095733 A2 | 11/2004 |
| WO | WO-2005062066 A2 | 7/2005 |
| WO | WO-2005103753 A1 | 11/2005 |
| WO | WO-2006031034 A1 | 3/2006 |
| WO | WO-2006076600 A1 | 7/2006 |
| WO | WO-2008100351 A2 | 8/2008 |
| WO | WO-2009009511 A2 | 1/2009 |
| WO | WO-2009070464 A1 | 6/2009 |
| WO | WO-2009079103 | 6/2009 |
| WO | WO-2010144765 A1 | 12/2010 |
| WO | WO-2011139201 A1 | 11/2011 |
| WO | WO-2012067328 A1 | 5/2012 |
| WO | WO-2014086409 A1 | 6/2014 |

OTHER PUBLICATIONS

3GPP, "3rd Generation Partnership Project; Technical Specification Group Radio Access Network; Evolved Universal Terrestrial Radio Access (E-UTRA); LTE Positioning Protocol (LPP) (Release 12)", 3GPP TS 36.355 V12.2.0 (Jun. 2014), 126 pages.

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0 (Sep. 2014), 124 pages.

3GPP, "3rd Generation Partnership Project; Technical Specification Group Radio Access Network; Evolved Universal Terrestrial Radio Access (E-UTRA); Physical layer; Measurements (Release 12)", 3GPP TS 36.214 V12.0.0 (Sep. 2014), 14 pages.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.5.0 (Sep. 2014), 877 pages.

(56) References Cited

OTHER PUBLICATIONS

3GPP, "3rd Generation Partnership Project; Technical Specification Group Radio Access Network; Further Advancements for E-UTRA Physical Layer Aspects (Release 9)", 3GPP TR 36.814 V1.7.0(Feb. 2010), 85 pages.
3GPP, "3rd Generation Partnership Project; Technical Specification Group Radio Access Network; Small cell enhancements for E-UTRA and E-UTRAN—Physical layer aspects (Release 12)", 3GPP TR 36.872 V12.1.0 (Dec. 2013), 100 pages.
3GPP, "3rd Generation Partnership Project; Technical Specification Group Radio Access Network; Study on 3D channel model for LTE (Release 12)", 3GPP TR 36.873 V12.0.0 (Sep. 2014), 42 pages.
3GPP, "3rd Generation Partnership Project; Technical Specification Group Radio Access Network; Study on Indoor Positioning Enhancements for UTRA and LTE (Release 13)", 3GPP TR 37.857 V0.0.2 (Oct. 2014), 8 pages.
3GPP, "3rd Generation Partnership Project; Technical Specification Group Services and System Aspects; Location Services (LCS); Service description; Stage 1 (Release 12)", 3GPP TS 22.071 V12.0.0 (Oct. 2014), 50 pages.
"3rd Generation Partnership Project; Technical Specification Group Services and System Aspects; Vocabulary for 3GPP Specifications," Release 12, 3 GPP TR 21.905, Version 12.0.0, Jun. 2013, 64 pp.
Intel Corporation, "OTDOA Performance in Shared Cell ID Scenario", 3GPP TSG RAN WG1 Meeting #80bis, R1-151444, Belgrade, Serbia, Apr. 20-24, 2015, 4 pages.
NextNav, "Revised SID: Study on Indoor Positioning Enhancements for UTRA and LTE", 3GPP TSG RAN Meeting #65, RP-141102, Edinburgh, Scotland, Sep. 9-12, 2014, 7 pages.
Nokia Networks, "Potential enhancements for OTDOA", 3GPP TSG-RAN WG1 #80b, R1-151833, Belgrade, Serbia, Apr. 21-24, 2015, 2 pages.
NTT DOCOMO, "Chairman's Note on Simulation Assumptions for UTDOA", 3GPP TSG RAN WG1 #61 Meeting, R1-103410, Montreal, Canada, May 10-14, 2010, 4 pages.
Qualcomm Incorporated, "Indoor Positioning Simulation Results", 3GPP TSG-RAN WG1 Meeting #80bis, R1-152192, Belgrade, Serbia, Apr. 20-24, 2015, 16 pages.
Qualcomm Incorporated, "OTDOA Positioning Enhancements", 3GPP TSG-RAN WG1 Meeting #80bis, R1-151422, Belgrade, Serbia, Apr. 20-24, 2015,10 pages.
Session Chairman (Qualcomm Inc.), "Summary of Ad-hoc session on Study on Indoor Positioning Enhancements for UTRA and LTE", 3GPP TSG RAN WG1 Meeting #80bis, R1-152378, Belgrade, Serbia, Apr. 20-24, 2015, 3 pages.
International Search Report and Written Opinion—PCT/US2016/030840—ISA/EPO—Jul. 20, 2016.
3GPP RAN WG1 #57bis R1-092305, "Positioning Support for Distributed Network Elements", LG-Nortel, pp. 103, Jun. 29-Jul. 3, 2009.
Vodafone Group, et al., "Tracking Areas in eNB", 3GPP TSG RAN WG3 #56, R3-071030, 3 Pages.

\* cited by examiner

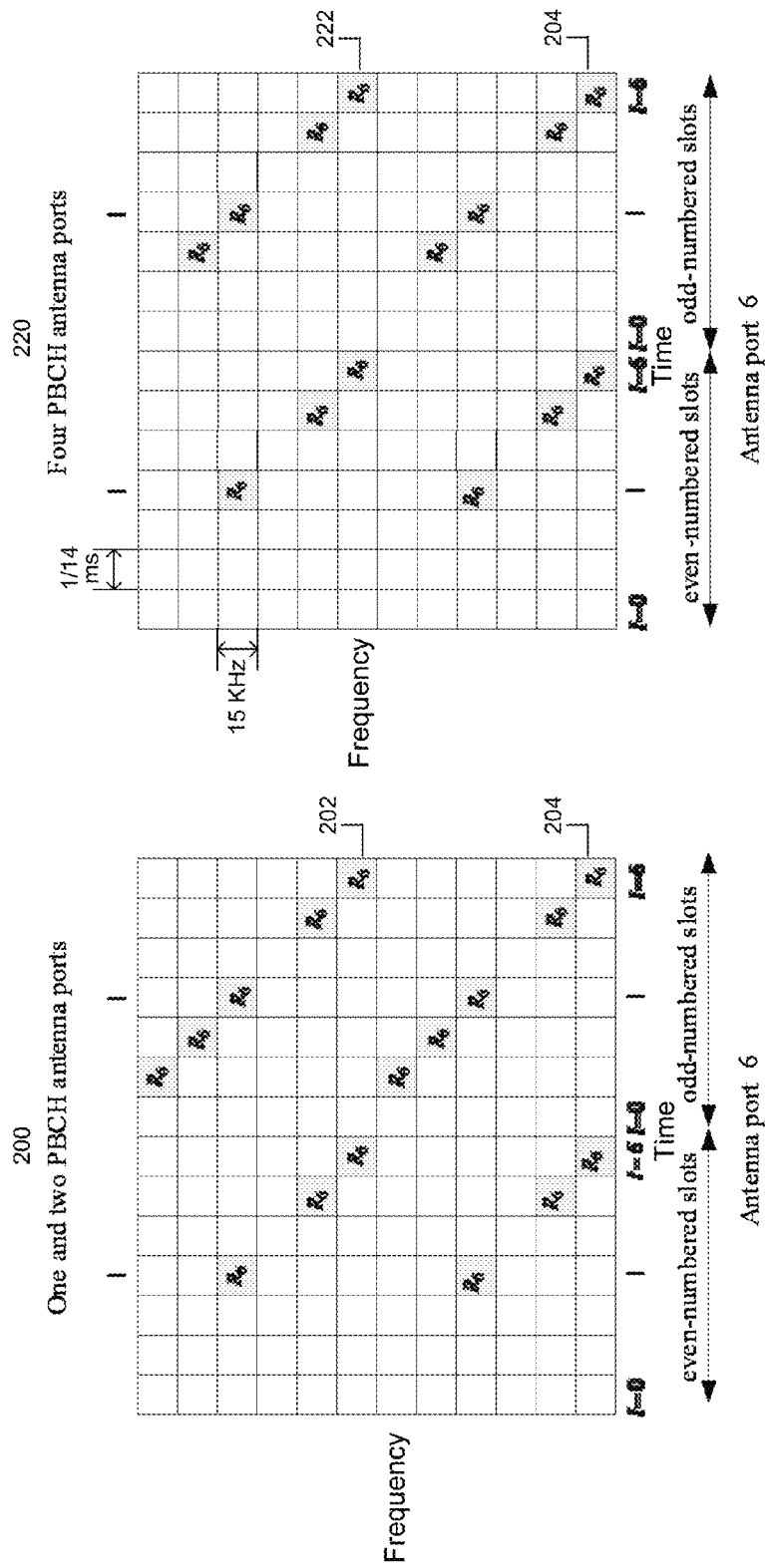

POSITIONING REFERENCE SIGNAL (PRS) GENERATION FOR MULTIPLE TRANSMIT ANTENNA SYSTEMS

CROSS REFERENCE TO RELATED APPLICATIONS

This application is a continuation of U.S. patent application Ser. No. 14/921,836 entitled "POSITIONING REFERENCE SIGNAL (PRS) GENERATION FOR MULTIPLE TRANSMIT ANTENNA SYSTEMS," filed Oct. 23, 2015, which claims the benefit of and priority to U.S. Provisional Application No. 62/160,442 entitled "Positioning Reference Signal (PRS) Generation for Multiple Transmit Antenna Systems," filed May 12, 2015. The above identified provisional and non-provisional applications are assigned to the assignee hereof and are incorporated by reference, in their entireties, herein.

FIELD

The subject matter disclosed herein relates to Positioning Reference Signal (PRS) generation for multiple transmit antenna systems.

BACKGROUND

It is often desirable to know the location of a terminal such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein.

In Observed Time Difference of Arrival (OTDOA) based positioning, the mobile station may measure time differences in received signals from a plurality of base stations. Because positions of the base stations are known, the observed time differences may be used to calculate the location of the terminal. To further help location determination, Positioning Reference Signals (PRS) are often provided by a base station (BS) in order to improve OTDOA positioning performance. The measured time difference of arrival of the PRS from a reference cell (e.g. the serving cell) and one or more neighboring cells is known as the Reference Signal Time Difference (RSTD). Using the RSTD measurements, the absolute or relative transmission timing of each cell, and the known position(s) of BS physical transmitting antenna element(s) for the reference and neighboring cells, the UE's position may be calculated.

However, when Base Stations (BS) use multiple physical transmitting antenna elements and the physical transmitting antenna elements are switched between PRS occasions, UE's that utilize multiple PRS occasions and coherent averaging/integration over the multiple PRS occasions to determine a Time of Arrival (TOA) value may obtain incorrect results because different propagation channels may have been used for different PRS occasions. Similarly, in a conventional distributed antenna system (DAS) spatially separate physical transmitting antenna elements, which belong to the same cell and share the same cell Physical Cell Identifier (PCI), transmit the same PRS signal. Consequently, in conventional DAS, the location of the signal transmitter in the DAS case may be ambiguous, and UE position calculation may be erroneous or not be possible. Position calculation is also ambiguous in traditional systems using low power Remote Radio Heads (RRHs) or small cells (e.g. femtocells) within a macrocell coverage area because the transmission points created by the spatially separate RRHs or small cells may have the same PCIs as the macro cell and consequently transmit identical PRS signals.

SUMMARY

In some embodiments, a processor-implemented method of generating a Positioning Reference Signal (PRS) sequence may comprise: assigning a distinct Physical Antenna Port (PAP) identifier (ID) to each physical transmitting antenna element in a plurality of physical transmitting antenna elements serving a single cell; and generating a plurality of PRS sequences, each PRS sequence in the plurality of PRS sequences corresponding to a distinct physical transmitting antenna element in the plurality of physical transmitting antenna elements, wherein each PRS sequence has a corresponding frequency shift based, at least in part, on a corresponding PAP ID (h) of a corresponding physical transmitting antenna element.

In some embodiments, an apparatus may comprise: a transceiver, wherein the transceiver capable of transmitting PRS information; and a processor coupled to the transceiver, wherein the processor may be configured to: assign a distinct Physical Antenna Port (PAP) identifier (ID) to each physical transmitting antenna element in a plurality of physical transmitting antenna elements serving a single cell; and generate a plurality of PRS sequences, each PRS sequence in the plurality of PRS sequences corresponding to a distinct physical transmitting antenna element in the plurality of physical transmitting antenna elements, wherein each PRS sequence has a corresponding frequency shift based, at least in part, on a corresponding PAP ID (h) of a corresponding physical transmitting antenna element.

In some embodiments, an apparatus may comprise: transceiver means capable of transmitting PRS information; and processing means coupled to the transceiving means, wherein the processing means may comprise: means for assigning a distinct Physical Antenna Port (PAP) identifier (ID) to each physical transmitting antenna element in a plurality of physical transmitting antenna elements serving a single cell; and means for generating a plurality of PRS sequences, each PRS sequence in the plurality of PRS sequences corresponding to a distinct physical transmitting antenna element in the plurality of physical transmitting antenna elements, wherein each PRS sequence has a corresponding frequency shift based, at least in part, on a corresponding PAP ID (h) of a corresponding physical transmitting antenna element.

In some embodiments, an article may comprise: a non-transitory computer readable medium comprising instructions to that are executable by a processor to: assign a distinct Physical Antenna Port (PAP) identifier (ID) to each physical transmitting antenna element in a plurality of physical transmitting antenna elements serving a single cell; and generate a plurality of PRS sequences, each PRS sequence in the plurality of PRS sequences corresponding to a distinct physical transmitting antenna element in the plurality of physical transmitting antenna elements, wherein each PRS sequence has a corresponding frequency shift based, at least in part, on a corresponding PAP ID (h) of a corresponding physical transmitting antenna element.

The methods disclosed may be performed by one or more of servers (including location servers), mobile stations, etc. using LPP, LPPe or other protocols. Embodiments disclosed also relate to software, firmware, and program instructions embodied on and/or created, stored, accessed, read or modified by processors using non-transitory computer readable media or computer readable memory.

BRIEF DESCRIPTION OF THE DRAWINGS

FIGS. 2A and 2B illustrate exemplary PRS allocations in an LTE resource block for two exemplary system configurations.

DETAILED DESCRIPTION

Figure 1A:
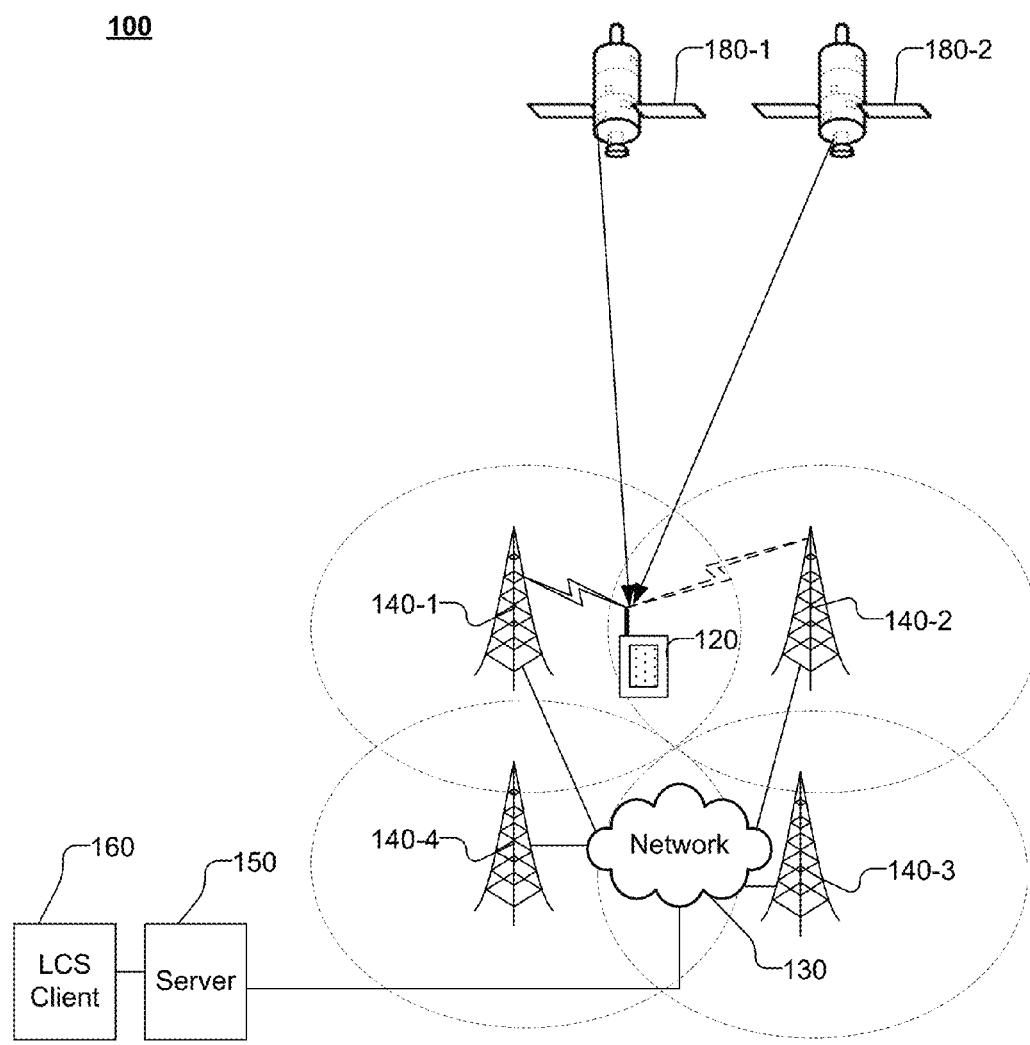
FIG. 1A shows an architecture of an exemplary system capable of providing Location Services to UEs including the transfer of location assistance data or location information.

Embodiments disclosed pertain to apparatus, systems and methods to improve position determinations and permit the use of PRS patterns for location determination in situations where antenna diversity schemes, DAS, and/or RRH systems are being used. In some embodiments, in a system comprising a plurality of physical transmitting antenna elements serving a single cell a distinct Physical Antenna Port (PAP) identifier (ID) may be assigned to each physical transmitting antenna element in a subset of two or more of the plurality of physical transmitting antenna elements. PRS sequences corresponding to each physical transmitting antenna element in the subset of physical transmitting antenna elements may then be generated. Each PRS sequence may correspond to a physical transmitting antenna element in the subset of physical transmitting antenna elements. In some embodiments, each PRS sequence may have a corresponding frequency shift based on the PAP ID (h) of the corresponding physical transmitting antenna element. For example, the frequency shift may be based on a function $f(PAP_h)$ obtained from the PAP ID (h) of the corresponding physical transmitting antenna element.

The use of a distinct PRS sequence for each physical transmitting element in the subset facilitates resolution of ambiguity related to the location of a physical transmitting antenna element. Thus, disclosed embodiments facilitate OTDOA based position using PRS in environments with multiple physical transmitting elements, such as systems using DAS and/or RRHs and/or small cells. In some embodiments, to facilitate utilization of the above frequency shifted PRS signals by legacy mobile stations, the function $f(PAP_h)$ may be set to 0 so that no frequency shift occurs for at least one of the physical transmitting antenna elements in the subset. In some embodiments, $f(PAP_h)$ may be based on identifier associated with a geographic portion of a cell. Further, in some embodiments, the PAP ID (h) may be transmitted to mobile stations as part of Observed Time Difference of Arrival (OTDOA) assistance information for the corresponding physical transmitting antenna element.

The terms "mobile station" (MS), "user equipment" (UE) or "target" are used interchangeably herein and may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms UE, MS, "mobile station" or "target" are intended to include all devices, including wireless and wireline communication devices, computers, laptops, etc. which are capable of communication with a server, such as via the Internet, WiFi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "mobile station."

FIG. 1A shows an architecture of a system 100 capable of providing Location Services to UEs including the transfer of location assistance data or location information, using messages such as Long Term Evolution (LTE) Positioning Protocol (LPP) or LPP extensions (LPPe) messages between UE 120 and server 150, which, in some instances, may take the form of a location server or another network entity. The transfer of the location information may occur at a rate appropriate to both UE 120 and server 150. The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

In many instances, a BS may use multiple physical transmitting antenna elements 140. For example, in urban environments, there may often be no clear line-of-sight (LOS) between a transmitter and UE 120 so that signals may be reflected along multiple paths before reception. These reflections can introduce phase shifts, time delays, attenuations, and distortions that can destructively interfere with one another at the receiving terminal.

In some embodiments, system 100 may use antenna diversity schemes, and/or a RRH system or DAS with multiple RRH transmitting elements or multiple physical transmitting antenna elements 140-1, 140-2, 140-3 and 140-4 (sometimes collectively referred to as physical transmitting antenna elements 140) to reduce multipath interference and for other reasons. For example, system 100 may be a DAS, which is a network of spatially separated physical transmitting antenna elements 140-1, 140-2, 140-3 and 140-4 connected to a common source. The DAS' may replace a single physical transmitting antenna element radiating at high power in a cell with a group of spatially distributed physical transmitting antenna elements 140-1, 140-2, 140-3 and 140-4 that cover the same cell. The DAS may permit coverage over the same area as a single physical transmitting antenna element but with reduced total power and improved reliability. For example, a single base station and a group of low power physical transmitting antenna elements 140-1, 140-2, 140-3 and 140-4 may be used to provide wireless coverage for an entire building, a city block, a campus, or another area.

As another example, system 100 may take the form of a Remote Radio Head (RRH) system or a small cell system where a network of spatially distributed radio transmitters, which may be physically remote from a BS, are connected to the BS using fiber optic cables or other high speed links. For example, multiple physical transmitting antenna elements 140 or RRH transmitting elements or small cell transmitting antenna elements may collectively serve a single cell, and RRHs or small cells may be used to extend the coverage of a BS into tunnels, rural areas etc.

For simplicity, only one UE 120 and server 150 are shown in FIG. 1A. In general, system 100 may comprise multiple cells with additional networks 130, LCS clients 160, UEs 120, servers 150, physical transmitting antenna elements 140, and Space Vehicles (SVs) 180. System 100 may further comprise a mix of cells using some combination of a single physical transmitting antenna element, antenna diversity schemes, DAS, and/or RRHs or small cells in a manner consistent with embodiments disclosed herein.

UE 120 may be capable of wirelessly communicating with server 150 through one or more networks 130 that support positioning and location services, which may include, but is not limited to, the Secure User Plane Location (SUPL) location solution defined by OMA and the Control Plane location solution defined by 3GPP for use with an LTE serving network. For example, Location services (LCS) may be performed on behalf of LCS Client 160 that accesses server 150 (which may take the form of a location server) and issues a request for the location of UE 120. Server 150 may then respond to LCS client 160 with a location estimate for UE 120. LCS Client 160 may also be known as a SUPL Agent—e.g. when the location solution used by server 150 and UE 120 is SUPL. In some embodiments, UE 120 may also include an LCS Client or a SUPL agent (not shown in FIG. 1A) that may issue a location request to some positioning capable function within UE 120 and later receive back a location estimate for UE 120. The LCS Client or SUPL Agent within UE 120 may perform location services for the user of UE 120—e.g. provide navigation directions or identify points of interest within the vicinity of UE 120.

Server 150 as used herein may be a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

As illustrated in FIG. 1A, the UE 120 may communicate with server 150 through network 130 and physical transmitting antenna elements 140, which may be associated with network 130. UE 120 may receive and measure signals from physical transmitting antenna elements 140, which may be used for position determination. In some embodiments, some physical transmitting antenna elements 140 may form part of a wireless communication network, which may be a wireless wide area network (WWAN). Other physical antenna transmitting elements 140 may form part of wireless local area network (WLAN), a wireless personal area network (WPAN), and so on. The term "network" and "system" are often used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, High Rate Packet Data (HRPD), Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. WCDMA is also part of the Universal Mobile Telecommunications System (UMTS). HRPD and Cdma2000 are described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, physical transmitting antenna elements 140 and network 130 may form part of, e.g., an evolved UMTS Terrestrial Radio Access Network (E-UTRAN) (LTE) network, a W-CDMA UTRAN network, a GSM/EDGE Radio Access Network (GERAN), a 1xRTT network, an Evolution-Data Optimized (EvDO) network, a WiMax network or a WLAN.

UE 120 may also receive signals from one or more Earth orbiting Space Vehicles (SVs) 180-1 or 180-2 collectively referred to as SVs 180, which may be part of a satellite positioning system (SPS). SVs 180, for example, may be in a constellation of Global Navigation Satellite System (GNSS) such as the US Global Positioning System (GPS), the European Galileo system, the Russian Glonass system or the Chinese Compass/BeiDou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 1B:
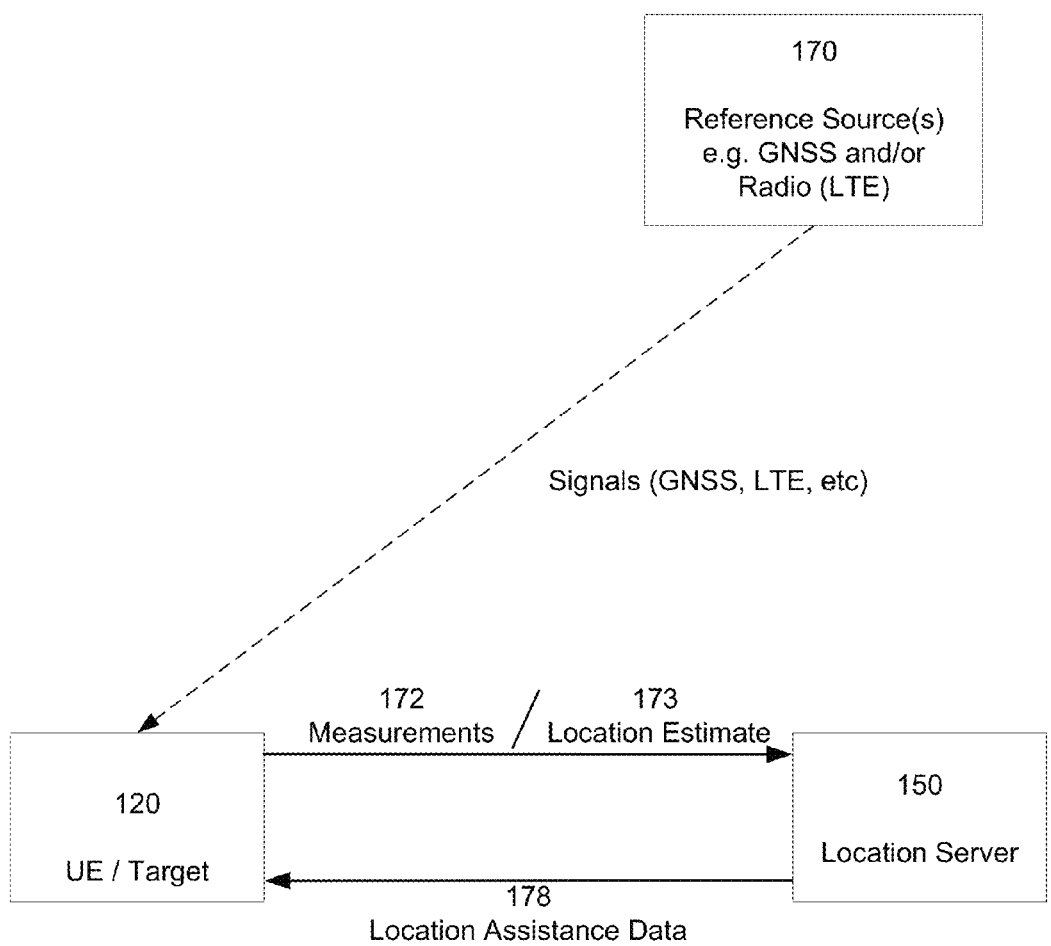
FIG. 1B is a simplified block diagram illustrating the provision Location Services to UEs including the transfer of location assistance data or location information.

FIG. 1B shows a simplified block diagram illustrating some entities in a system 175 capable of determining the location of UE 120. Referring to FIG. 1B, UE 120 may measure signals from reference source(s) 170 to obtain measurements and/or location estimate 173. Reference source(s) 170 may represent signals from SVs 180 and/or physical transmitting antenna elements 140 associated with network 130. Accordingly, UE 120 may obtain measurements 172 by measuring pseudo-range measurements for SVs 180 and/or OTDOA related measurements from physical transmitting antenna elements 140. In some instances, UE 120 may also obtain a location estimate 173 by using measurements 172, which may be pseudo-range and/or OTDOA related measurements to derive an estimated position for UE 120. UE 120 may provide location related information, such as location estimate 173 or measurements 172 (e.g., satellite measurements from one or more GNSSs, or network measurements such as RSTDs from one or more networks, etc.) to server 150.

In some instances, the OTDOA related measurements taken by UE 120 may be sent to server 150 to derive a position estimate for UE 120. Server 150 may provide location related information, such as an approximate location of UE 120 and/or location assistance data 178 to UE 120, which may be used to assist UE 120 in acquiring and measuring signals from SVs 180 and physical transmitting antenna elements 140, and/or in deriving or refining a location estimate 173 from these measurements 172. For example, UE 120, which in some instances may take the form of a Secure User Plane (SUPL) Enabled Terminal (SET), may communicate with server 150 and use location assistance data 178 obtain a location estimate for UE 120, which may then be communicated to LCS client 160 (not shown in FIG. 1B).

Referring to FIG. 1A, in some embodiments, physical transmitting antenna elements 140 may also transmit Positioning Reference Signals (PRS). PRS, which have been defined in 3GPP Long Term Evolution (LTE) Release-9, are transmitted by a base station in special positioning subframes that are grouped into positioning occasions. For example, in LTE, the positioning occasion, which can comprise 1, 2, 4, or 6 consecutive positioning subframes, occurs periodically at 160, 320, 640, or 1280 millisecond intervals.

Within each positioning occasion, PRSs are transmitted with a constant power. PRS can also be transmitted with zero power (i.e., muted). Muting, which turns off a regularly scheduled PRS transmission, may be useful when PRS patterns between cells overlap. Muting aids signal acquisition by UE 120. Muting may be viewed as the non-transmission of a PRS for a given positioning occasion in a particular cell. Muting patterns may be signaled to UE 120 using bitstrings. For example, in a bitstring signaling a muting pattern, if a bit at position j is set to "1", then an UE may infer that the PRS is muted for the $j^{th}$ positioning occasion.

Muting may, in some instances, facilitate separation of transmission points in the time domain. However, when muting is used for location determination, mobile stations typically report the muting pattern and RSTD measurements to a location server, which creates additional overhead. Moreover, in addition to the overhead above, to avail of location services based on muting pattern measurements, a mobile station may request further location assistance, to determine: (i) when the muting patterns are associated with location services (so that the muting pattern measurements associated with location services may be reported); and (ii) when they are being used solely for interference mitigation (so that the muting pattern measurements related to interference mitigation are not reported).

Moreover, legacy mobile stations without the capacity to measure the muting pattern may be unable to avail of location services. For example, legacy mobile stations may merely measure a "composite signal" and a location server may be unable to identify the transmission point based on the measurements. In addition, because muting patterns are primarily designed to reduce interference, the use of muting patterns to additionally distinguish transmission points (e.g. create RRH separation) may lead to network complexities and further constrain the use of muting patterns for interference reduction. Further, 16-bit muting patterns do not permit separation of the up to 72 transmission points supported under the LPP standard.

To further improve hearability of PRS, positioning subframes may be low-interference subframes that are transmitted without user data channels. As a result, in ideally synchronized networks, PRSs may receive interference from other cell PRS' with the same PRS pattern index (i.e., with the same frequency shift), but not from data transmissions. The frequency shift is defined as a function of the Physical Cell Identifier (PCI) resulting in an effective frequency re-use factor of 6.

FIGS. 2A and 2B illustrate exemplary PRS allocations in an LTE resource block for two exemplary system configurations. LTE supports the transmission of reference signals using one, two or four Physical Broadcast Channel (PBCH) antenna ports. FIG. 2A shows the configuration for a system 200 with one and two PBCH antenna ports. FIG. 2B shows the configuration for a system 220 with four PBCH antenna ports. In FIGS. 2A and 2B time is shown along the horizontal axis and frequency on the vertical axis. As shown in FIGS. 2A and 2B, LTE PRS' are transmitted on logical antenna port 6.

For LTE Radio Frames of 10 ms duration each in downlink Frequency Division Duplex (FDD) mode, the LTE Radio Frames may be organized into ten subframes of 1 ms duration each. In the frequency domain, the available bandwidth may be divided into uniformly spaced orthogonal subcarriers. For example, for a normal length cyclic prefix using 15 KHz spacing, subcarriers may be bracketed into a group of 12. Each grouping, which may comprise 12 subcarriers, is termed a resource block.

When a normal cyclic prefix (CP) is assumed, the resource block may include 14 Orthogonal Frequency Division Multiplexing (OFDM) symbols in time and 12 subcarriers in frequency. In FIGS. 2A and 2B above, each subcarrier occupies 15 kHz and the OFDM symbol duration including the cyclic prefix is $\frac{1}{14}$ milliseconds (UE). The number of available resource blocks on each channel, which is also called the transmission bandwidth configuration of an LTE carrier, may be in the range from 6 to 100 resource blocks, corresponding to channel bandwidths of 1.4 MHz to 20 MHz.

In FIGS. 2A and 2B, each square indicates a resource element for a subcarrier with time domain index "l". Further, in FIGS. 2A and 2B, OFDM symbols that have been labeled $R_6$ are PRS symbols, such as, for example, PRS symbols 202 (FIG. 2A) and 222 (FIG. 2B). Thus, the squares labeled $R_6$ indicate PRS resource elements in a block of 12 subcarriers over 14 OFDM symbols.

As shown in FIGS. 2A and 2B, the PRS symbols are arranged in a diagonal pattern. In frequency domain, the PRS symbols are 6 subcarriers apart as shown by PRS symbols 202 and 204 in FIG. 2A, and PRS symbols 222 and 224 in FIG. 2B.

Figure 2C:
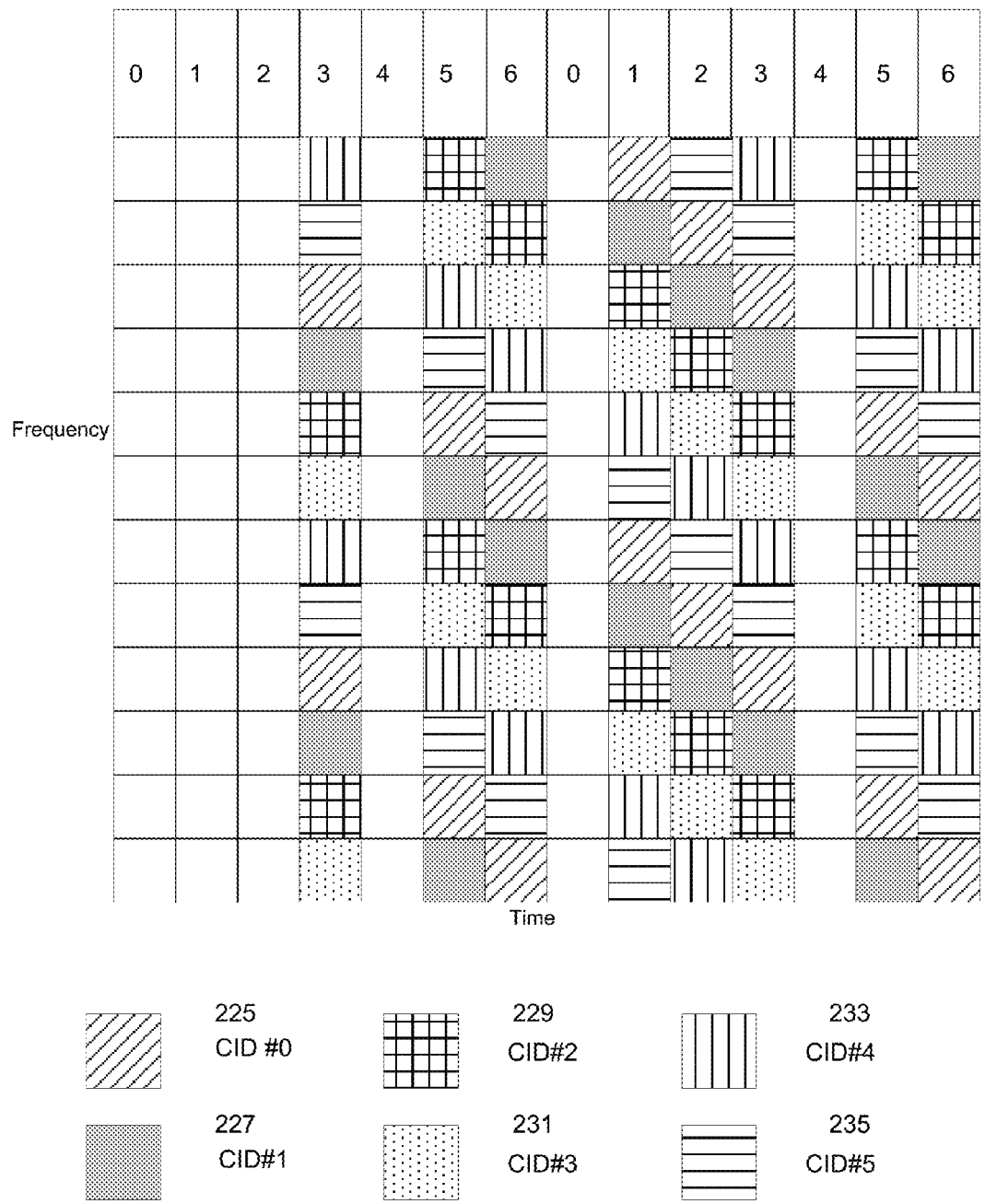
FIG. 2C illustrates a resource block showing six distinct diagonal patterns of PRS symbols.

FIG. 2C illustrates a resource block showing six distinct diagonal patterns of PRS symbols. The PRS symbols are shown in FIG. 2C as CID#0 225, CID#1 227, CID#2 229, CID#3 231, CID#4 233, CID#5 235, and CID #5 235. In FIG. 2C, each PRS symbol is represented using a distinct shading pattern. The PRS pattern is determined by the frequency shift, which is defined as a function of the Physical Cell Identifier (PCI) resulting in an effective frequency re-use factor of 6. The frequency shift is given by vshift=mod(PCI, 6), where the "mod" function represents the modulus and yields the remainder when the first argument (PCI) is divided by the second argument (6). Thus, the PCI for a cell effectively determines one of six available PRS patterns. If two cells have the same vshift value, for example cells with PCI's 0 and 6, those cells will collide in the frequency domain and interfere with each other.

The PRS sequence transmitted by a cell is specified in 3GPP standards and technical specifications as follows:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots 2N_{RB}^{max,DL} - 1$$

where, $n_s$ is the slot number within a radio frame (slot=0.5 UE; frame=10 UE), $n_s$=0 . . . 19;

l is the OFDM symbol number within the slot;

l=0 . . . 6 for normal cyclic prefix; and l=0 . . . 5 for extended cyclic prefix.

c(i) is a length-31 Gold sequence $N_{RB}^{max,DL}$ is the largest downlink bandwidth configuration, expressed in multiples of $N_{SC}^{RB}$;

$N_{sc}^{RB}$ is the resource block size in the frequency domain, expressed as a number of subcarriers.

$N_{sc}^{RB}$=12 subcarriers for PRS, with 15 kHz spacing (180 kHz total).

A Gold sequence is a binary sequence used in telecommunication and satellite navigation and is useful when multiple devices are broadcasting in the same frequency range because a set of Gold code sequences have small bounded cross-correlations.

The pseudo-random sequence generator for c(i) is initialized with $$c_{init} = 2^{10} \cdot (7 \cdot (n_s+1)+l+1) \cdot (2 \cdot N_{ID}^{cell}+1)+2 \cdot N_{ID}^{cell}+N_{CP} \quad (2)$$

at the start of each OFDM symbol where $$N_{CP} = \begin{cases} 1 & \text{for normal Cyclic Prefix} \\ 0 & \text{for extended Cyclic Prefix} \end{cases}$$

$N_{ID}^{cell}$ Physical layer Cell Identity (PCI).

The reference signal sequence is mapped to complex-valued QPSK modulation $a_{k,l}^{(p)}$ symbols used as reference signal for antenna port p=6 in slot $n_s$:

where,

Normal Cyclic Prefix:

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 PBCH antenna ports)} \\ 2, 3, 5, 6 & \text{if } n_s \bmod 2 = 1 \text{ and (4 PBCH antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

Extended Cyclic Prefix:

$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and (1 or 2 PBCH antenna ports)} \\ 2, 4, 5 & \text{if } n_s \bmod 2 = 1 \text{ and (4 PBCH antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

The bandwidth for positioning reference signals is $N_{RB}^{PRS}$ and the cell-specific frequency shift is given by $v_{shift} = N_{ID}^{cell} \bmod 6$ (also written as vshift=mod(PCI, 6)). Therefore, the PRS transmitted by a cell is determined by the frame and slot timing of the cell ($n_s$, l), the cyclic prefix length ($N_{CP}$), and the PCI $N_{ID}^{cell}$.

PRS configuration parameters, such as the number of consecutive positioning subframes, periodicity, muting pattern, etc. may be decided by network 130 and may be signaled to UE 120 (e.g. by server 150) as part of the OTDOA assistance data. OTDOA assistance data may include reference cell information (PCI) and neighbor cell lists containing the PCI of neighbor cells and the PRS configuration parameters for the cells. OTDOA assistance information may allow a UE to determine when a PRS positioning occasion occurs on signals received from various cells, and to determine the PRS sequence transmitted from various cells to measure a TOA.

In conventional systems, antenna diversity is often used to mitigate multipath interference because each physical transmitting antenna element may experience a different interference environment thereby offering UE 120 several observations of the same signal. For example, if one physical transmitting antenna element is experiencing a deep fade, it is likely that another has a sufficient signal at the terminal. However, in conventional systems, the PRSs are transmitted from a single antenna port—port 6—and therefore, cannot exploit the diversity from multiple physical transmitting antenna elements. To overcome this limitation, in conventional systems, base stations may employ switching of physical transmit antenna elements for the PRS, where the physical transmitting antenna element is switched between PRS occasions. Accordingly, each PRS occasion may be transmitted from a single physical transmitting antenna element, but PRS occasions alternate between several physical transmitting antenna elements. In the above situation, if a UE uses multiple PRS occasions and coherent averaging/integration over the multiple PRS occasions to determine a Time of Arrival (TOA) value, then the TOA value obtained from coherent averaging would be incorrect because of the use of different propagation channels for different PRS occasions.

Similarly, in conventional systems using a DAS, UEs cannot correlate received PRS signals with individual DAS elements because geographically distributed DAS physical transmitting antenna elements, which belong to the same cell and share the same cell Physical Cell Identifier (PCI), transmit the same PRS signal. Consequently, the location of the signal transmitter in the DAS case may be ambiguous, and UE position calculation may not be possible.

Position calculation is also ambiguous in traditional systems using low power Remote Radio Heads (RRHs) or small cells within a macrocell coverage area because the transmission points created by the RRHs or small cells may have the same PCIs as the macro cell and consequently transmit identical PRS signals. For example, this may occur in some scenarios when using LTE-Advanced Cooperative Multi Point (CoMP) transmission. CoMP relates to protocols and techniques for coordination between multiple transmission points to mitigate interference between transmitted signals and enhance received signal quality.

In these scenarios, UEs will not be able to correlate received PRS signals with individual RRH elements thereby creating ambiguity in location calculation.

Accordingly, in some embodiments, for example, in situations where antenna switching is used, OTDOA assistance information may include PRS assistance information, such as antenna switching assistance information indicating whether antenna switching for PRS transmission is used in a cell. In some embodiments, PRS assistance data sent to UE 120 may also include additional antenna switching assistance information. For example, server 150 may include antenna switching assistance information in OTDOA assistance data provided as part of the LPP or LPPe protocol.

In one embodiment, the antenna switching assistance information may include a Boolean parameter which indicates whether antenna switching between PRS positioning occasions occurs in a cell. The Boolean parameter for a cell may be set to TRUE, if antenna switching occurs in the cell, or to FALSE, if antenna switching does not occur in the cell. If set to TRUE for a cell, the Boolean parameter may indicate to UE 120 that coherent averaging over multiple PRS occasions should not be used for that cell. If set to FALSE for a cell, the Boolean parameter may indicate that UE 120 could use multiple PRS occasions coherently to determine a TOA value for location determination.

In another embodiment, UE 120 may use a single PRS positioning occasion to determine a time-of-arrival (TOA). If antenna switching assistance data indicates that antenna switching is used between PRS occasions, UE 120 may determine multiple TOA values, for example, by determining one TOA value every PRS occasion. In case of antenna switching, each TOA from a PRS positioning occasion may be slightly different because each PRS occasion may experience a different interference/channel environment. The UE may select the shortest TOA value among the set of TOA values as a final TOA measurement, since the shortest TOA value may be closer to the desired LOS delay for position calculation purposes.

If antenna switching assistance data indicates that antenna switching is not used between PRS occasions, UE 120 may not determine a set of TOA values as described above. If PRS are transmitted from a single physical transmitting antenna element (e.g., without physical transmitting antenna element switching), each PRS occasion may experience essentially the same radio channel, and therefore, determining multiple TOAs may be of no advantage. Accordingly, in some embodiments, UE 120 may use antenna switching assistance data advantageously to decide whether the determination of multiple TOA values would be useful, thereby conserving power and processor resources in situations where antenna switching is not used.

In another embodiment, the antenna switching assistance information may provide antenna switching pattern information. Antenna switching pattern information may be useful, for example, in situations where antenna switching is not performed for each PRS positioning occasion, but switching between physical transmitting antenna elements 140-1, 140-2, 140-3, and/or 140-4 may occur every $r^{th}$ PRS positioning occasion, where r≥1, is some integer. For example, for r=2, switching among physical transmitting antenna elements 140-1, 140-2, 140-3, and/or 140-4 may occur every second PRS positioning occasion.

In some embodiments, antenna switching pattern information may take the form of a bit string. The bit string could indicate, for example, when antenna switching occurs and how many PRS positioning occasions are transmitted before a physical transmitting antenna element is switched in the cell. In some embodiments, antenna switching pattern information may be provided using a matrix where each row of the matrix represents a physical transmitting antenna element, such as one of antennas 140-1, 140-2, 140-3, and 140-4, and each column represent a PRS positioning occasion. Accordingly, for example, a "1" at location (x, y) on the $x^{th}$ row and $y^{th}$ column of the matrix may indicate that a scheduled $y^{th}$ PRS positioning occasion is transmitted by the $x^{th}$ physical transmitting antenna element, while a "0" at location (x, y) may indicate that the scheduled $y^{th}$ positioning occasion PRS occasion is not transmitted by the $x^{th}$ physical transmitting antenna element. In some embodiments, switching information could be defined relative to a radio frame with System Frame Number 0 (SFN=0).

For example, in an instance with two physical transmitting antenna elements, antenna switching every PRS positioning occasion could be indicated by:

$$\text{Antenna Switching Pattern} = \begin{bmatrix} 0 & 1 \\ 1 & 0 \end{bmatrix}$$

In the above example, each row of the matrix may correspond to a physical transmitting antenna element and each column of the matrix may indicate a PRS occasion. In the example above, switching occurs every PRS positioning occasion.

A matrix to indicate antenna switching every second PRS positioning occasion may take the form $$\text{Antenna Switching Pattern} = \begin{bmatrix} 0 & 0 & 1 & 1 \\ 1 & 1 & 0 & 0 \end{bmatrix}$$

The matrix above may indicate that physical transmitting antenna element 140-1 transmits PRS positioning information for the second two PRS positioning occasions, while physical transmitting antenna element 140-2 transmits PRS positioning information for the first two PRS positioning occasions. Referring to FIG. 3B, for DAS 350, with physical transmitting antenna elements 140-1, 140-2, 140-3, and 140-4 a matrix to indicate switching every second PRS positioning occasion may take the form $$\text{Antenna Switching Pattern} = \begin{bmatrix} 0 & 0 & 1 & 1 & 0 & 0 & 0 & 0 \\ 1 & 1 & 0 & 0 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix}$$

The matrix above indicates that physical transmitting antenna element 140-2 transmits for the first two PRS positioning occasions, followed by physical transmitting antenna element 140-1, which transmits for the next two PRS positioning occasions, followed in turn by physical transmitting antenna element 140-3 for the two subsequent PRS positioning occasions, which is then followed by physical transmitting antenna element 140-4 for the next two PRS positioning occasions. Note that the use of matrices to specify antenna switching patterns is exemplary and for descriptive purposes only and various other representations are envisaged as would be apparent to one of ordinary skill in the art.

The 3GPP standard and technical specifications also define logical antenna ports for the downlink to UE 120. An "antenna port" or a "logical antenna port" is generally used as a generic term for signal transmission under identical channel conditions. Antenna ports are logical entities that are dynamically mapped to physical transmitting antenna elements 140 or to Physical Antenna Ports (PAPs). Logical antenna ports may be viewed as logical channels that are characterized by the information they transfer, whereas, physical transmitting antenna elements may be viewed as transport channels characterized by how the information is transferred. The dynamic mapping of logical antenna ports to physical transmitting antenna elements thus maps logical channels to transport channels by assigning logical antenna ports to physical transmitting antenna elements.

Physical Antenna Ports (PAPs) may also identify a portion of a cell. For example, physical transmit antenna 140-1 may serve a portion of a cell. If a target device is known to be connected to physical transmit antenna 140-1, the location of the target device may be determined at least in part based on the cell portion associated with the coverage area of physical transmit antenna 140-1.

For each LTE operating/transmission mode in the downlink direction for which an independent channel is assumed (e.g. Single Input and Single Output (SISO) vs. Multiple In Multiple Out (MIMO)), a separate logical antenna port is defined. LTE symbols that are transmitted via identical logical antenna ports are subject to the same channel conditions. The mapping of logical antenna ports to physical transmitting antenna elements of a BS may depend on BS implementation.

In some embodiments, for example, where physical transmitting antenna elements 140 represent a DAS with antennas 140-1, 140-2, 140-3 and 140-4, logical antenna port 6, which is used for PRS transmission, may be mapped to Physical Antenna Ports (PAPs), and a PRS sequence may be generated as a function of the Physical Antenna Port Identifier (PAP ID). In equations (3) and (4) below the function of PAP ID is denoted by $f(PAP_h)$. Similarly, in situations where a cell is served by multiple RRHs or small cells, logical antenna port 6 on the RRHs or small cells may be mapped to PAPs, and a PRS sequence may be generated as a function of the PAP ID. For example, in one implementation, in order to distinguish PRSs at different physical transmitting antenna elements for a particular eNodeB (BS) with PCI $N_{ID}^{cell}$, the initialization seed for the PRS sequence may be a function of the PAP. Accordingly, in some embodiments, $c_{init}$, in initialization equation (2), above, may be modified for a PAP as, $$c_{init} = 2^{10} \cdot (7 \cdot (n_s+1)+l+1) \cdot (2 \cdot N_{ID}^{cell}+1) + 2 \cdot N_{ID}^{cell} + N_{CP} + f(PAP_h) \quad (3)$$

where $PAP_h$ corresponds to physical antenna port h, for $0 \le h \le \eta_{pap}$, and $\eta_{pap}$ is the number of physical antenna ports. Because $c_{init}$ in Equation (3) above is a function of PAP ID $PAP_h$, in some embodiments, a different PRS sequence may be transmitted from each DAS physical transmitting antenna element or RRH or small cell.

In another embodiment, $c_{init}$, in initialization equation (2), above, may be modified for a PAP as, $$c_{init} = 2^{10} \cdot (7 \cdot (n_s+1)+l+1) \cdot (2 \cdot (N_{ID}^{cell}+f(PAP_h))+1) + 2 \cdot (N_{ID}^{cell}+f(PAP_h)) + N_{CP} \quad (4)$$

$f(PAP_h)$ in equations (3) and (4) may be absent or zero for the macro cell. Therefore, according to equations (3) and (4) above, the PRS sequence depends on both the PCI $N_{ID}^{cell}$, and on the RRH or transmission point ID $f(PAP_h)$.

$f(PAP_h)$ may be an integer starting at zero, or, as another example, may start with an offset of 503. In LTE, the PCI can take values from 0 through 503, therefore, in some embodiments, new "effective PCIs" given by $f(PAP_h)$ with values greater than 503 may be used for the RRH/DAS elements, or in general for the PRS physical transmitting antenna elements.

In some embodiments, $f(PAP_h)$ may be based on, obtained from, or equal to, the "Cell Portion ID" defined in 3GPP Technical Specification 36.455 "LTE Positioning Protocol A (LPPa)", Release-12. A Cell Portion is a geographical part of a cell and may be uniquely identified by a corresponding "Cell Portion ID".

In some embodiments, the frequency shift vshift of the PRS pattern for the PRS transmission antenna elements, such as for a RRH or DAS element, may be modified based on the sum of the PCI and $f(PAPh)$ as outlined in equation (5) below.

$$v{\text{shift}} = \text{mod}((N_{ID}^{cell}+f(PAP_h)), 6) \quad (5)$$

When vshift is modified as in Equation (5), the transmission points may be separated in both, the code- and frequency domain, because each physical transmission antenna element associated with a transmission point transmits a different diagonal PRS pattern relative to other physical transmitting antenna elements associated with that transmission point. The diagonal pattern transmitted by the physical transmitting antenna element is based on both the PCI associated with the transmission point and a function $f(PAP_h)$ of the PAP ID of the physical transmitting antenna element.

In some embodiments, server 150 may transmit the PAP ID as part of OTDOA assistance information by server 150. Further, the PAP ID may be transmitted as part of OTDOA assistance information based, in part, on received information indicating a capability to generate a replica PRS sequence at UE 120 in communication with server 150. In some embodiments, the OTDOA assistance information may be provided by adding PAP ID, $f(PAP_h)$, or information obtained from PAP ID, or a similar field to appropriate OTDOA assistance information.

In some embodiments, UE 120 may transmit the PAP ID as part of the OTDOA measurement information to server 150 in a measurement report message, indicating to server 150 from which PAP the OTDOA measurement has been made.

In some embodiments, equations (3) or (4) may be used with antenna diversity schemes because antenna switching may be considered as equivalent to mapping the antennas to PAPs and applying a muting pattern for each physical transmitting antenna element where PRS occasions are muted alternately between the physical transmitting antenna elements. In some embodiments, the logical antenna port 6 may be mapped to multiple PAPs based on the number of physical transmitting antenna elements switched. For example, in the case of two physical transmitting antenna elements, logical antenna port 6 may be assigned to two PAPs, $PAP_0$ and $PAP_1$. According to equations (3) or (4) above, $PAP_0$ and $PAP_1$ would transmit a different PRS sequence. Further, in the example above, in some embodiments, antenna switching may be indicated using a muting pattern defined in the OTDOA assistance data, to indicate that one PAP is muted during PRS transmissions of the other PAP.

In some embodiments, the logical antenna port 6 may be mapped to multiple PAPs based on the number of physical transmitting antenna elements switched. For example, in the case of two physical transmitting antenna elements, logical antenna port 6 may be assigned to two PAPs, $PAP_0$ and $PAP_1$. The frequency shift of the PRS pattern may depend on the PAP ID as described above in equation (5), where vshift=mod$((+f(PAP_h)), 6)$, with $f(PAP_h)=PAP_0$ or $PAP_1$ in the case of two physical transmitting antenna elements. Therefore, the physical transmitting antenna elements identified by $PAP_0$ and $PAP_1$ would each transmit distinct PRS frequency patterns.

In some embodiments, where different PRS sequences are transmitted (as described above) by different PAPs each associated with a physical transmitting antenna element at a different location (e.g. as for a cell with multiple RRHs), additional OTDOA assistance data may be provided to UE 120 to assist acquisition and measurement of each PRS sequence. As an example, the approximate expected RSTD for each PRS sequence may be provided and/or the location or relative location of each of physical transmitting antenna elements 140.

In addition, in some embodiments, to ensure that legacy mobile stations are not affected by the above PRS related changes, mobile station capability indication for PAPs may be added to the OTDOA capabilities defined in LPP or LPPe. In one embodiment, for example, to ensure legacy support, one physical transmitting antenna element, such physical transmitting antenna element 140-1 with PAP ID $PAP_0$, may not change its PRS sequence or frequency shift pattern, which may be achieved by setting $f(PAP_h)=0$, for h=0, in equations (3) or (4). Similarly, $f(PAP_h)$ may be set to 0, for h=0 in equation (5), which relates to the frequency shift vshift. Accordingly, in the previous example, the PRS sequence and frequency pattern may be unchanged for $PAP_0$, thereby providing support for legacy mobile stations.

In some embodiments, where mobile station capability information from UE 120 indicates support for multi-PRS sequences and multi-PRS frequency shifts (i.e., multiple PRS sequences and frequency shifts for a single PCI) from the same cell/PCI, server 150 may include such cells in OTDOA assistance data and UE 120 may undertake OTDOA measurements from transmitters in a DAS or RRH system or small cell system, since physical transmitter locations may be mapped to the multi-PRS sequence and frequency shift.

If mobile station capability information from UE 120 indicates a lack of support for multi-PRS sequences from the same cell/PCI, server 150, may not include such cells in OTDOA assistance data. As outlined earlier, because OTDOA positioning would be impractical for legacy mobile stations in cells with DAS or RRHs, such cells may already be omitted from OTDOA assistance information provided by server 150. Accordingly, the omission of multi-PRS cells from OTDOA assistance data may have minimal or no impact for legacy mobile stations.

In some embodiments, UE 120 may use the PCI, in conjunction with multi-PRS sequences and frequency shifts and/or OTDOA assistance data comprising one or more of: PRS assistance information, antenna switching assistance information, antenna switching pattern information, and/or muting information to make OTDOA measurements. In some embodiments, UE 120 may make OTDOA measurements using the above information in cells with antenna diversity, DAS, or RRH systems.

In some embodiments, the OTDOA measurements may be used by UE 120 and/or server 150 to determine the location of UE 120. For OTDOA positioning, by unambiguously identifying cells, physical transmitting antenna elements 140, or RRHs from which the OTDOA measurements have been made, UE 120 or server 150 may use the actual location of physical transmitting antenna elements 140, which can then be utilized for position calculation.

Figure 2D:
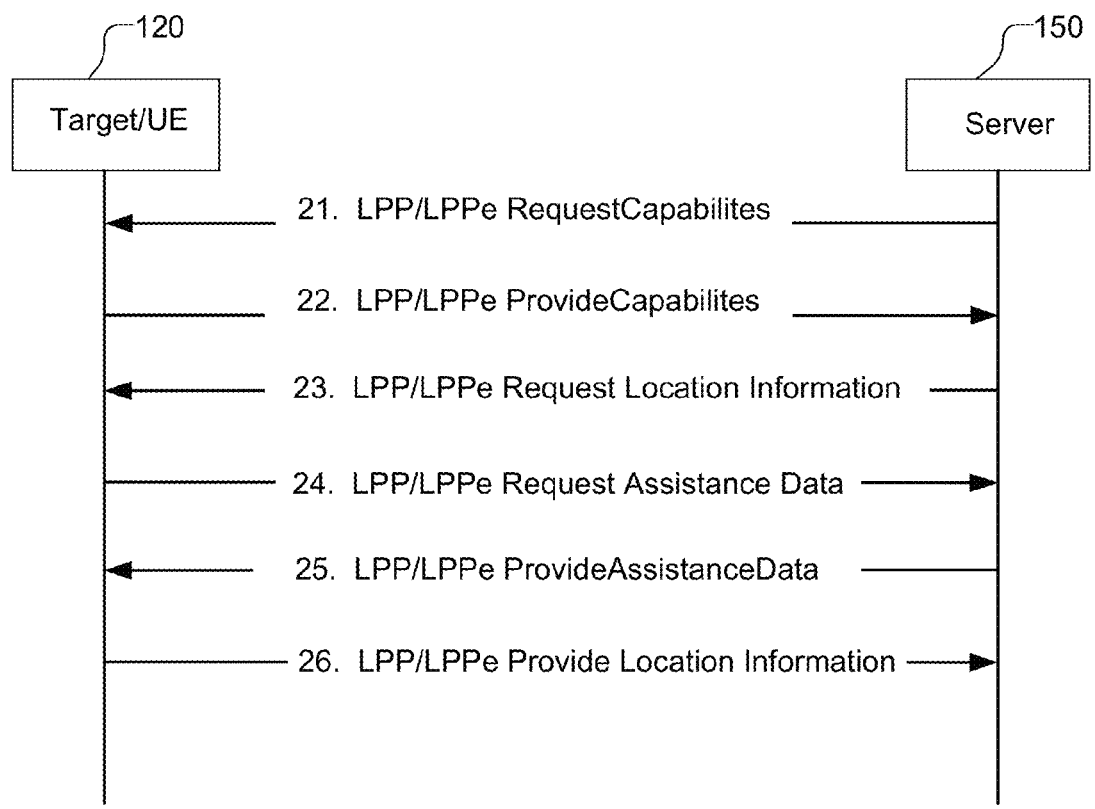
FIG. 2D illustrates the message flow of a basic procedure that supports transfer of assistance data from a server to a mobile station, and transfer of location information from a mobile station to a server.

FIG. 2D illustrates the message flow of a basic procedure that supports transfer of assistance data from the server 150 to the UE 120 and transfer of location information (e.g., RSTD measurement) from UE 120 to server 150 using a connection and, where applicable, a location session between the UE 120 and server 150 that remains established during the entire data transfer. For the sake of example, the message flow is described as LPP/LPPe positioning protocol messages, but it should be understood that other types of messages may be used if desired (e.g. LPP messages).

In block 21, if the LPP/LPPe capabilities including the multi-PRS sequence and frequency shift and antenna switching assistance data capabilities of the UE 120 are not known to server 150, then, in some embodiments, server 150 may send an LPP/LPPe Request Capabilities message to UE 120. The Request Capabilities message, which requests the LPP/LPPe capabilities of the UE 120, may include, among other parameters, a request for OTDOA capabilities, including capability indication for PAPs and/or support for multi-PRS sequences and frequency shifts from the same cell/PCI.

The UE 120 may respond with a LPP/LPPe Provide Capabilities message sent to the server 150 in block 22 of the message flow. In certain aspects of the described embodiments, the Provide Capabilities message may be provided by UE 120 unsolicited in block 22 in the absence of a Request Capabilities message being sent in block 21. In another embodiment, the Provide Capabilities message in block 22 may be sent instead by UE 120 in association with a request for assistance data sent later in block 24. The Provide Capabilities message includes, among other parameters, an indication of UE OTDOA capabilities, including capability indication for PAPs and/or support for multi-PRS sequences and frequency shifts from the same cell/PCI.

Actions similar to those performed in blocks 21 and 22 but with message transfer in the opposite direction may be performed instead of block 21 and 22 or in addition to blocks 21 and 22 to transfer the LPP/LPPe capabilities of server 150 to UE 120 regarding support for OTDOA capabilities, including capability indication for PAPs and/or support for multi-PRS sequences and frequency shifts from the same cell/PCI. The above actions are not shown in FIG. 2 and, if used, may make use of a reversed LPPe mode whereby a UE 120 is enabled to request and receive capabilities from a server 150.

In block 23 of the message flow, the server 150 requests location information from UE 120 in a LPP/LPPe Request Location Information message. The request for location information may include a request for RSTD measurements to be performed by UE 120.

In some embodiments, UE 120 may request OTDOA assistance data in order to fulfill the request received in block 23 and may send an LPP/LPPe request for assistance data to the server 150, in block 24. In some embodiments, UE 120 may specify the particular assistance data requested, such as OTDOA assistance data, including one or more of PRS assistance information, antenna switching assistance information, antenna switching pattern information, and/or muting information, and/or PAP assistance information. In some embodiments, block 24 may not occur and the server 150 may decide to send assistance data to UE 120 unsolicited. In some embodiments, PAP assistance information may be based on, obtained from, or equal to $f(PAP_h)$.

In block 25 of the message flow, server 150 may obtain the assistance data to be transferred to UE 120. If block 24 was performed, the assistance data may comprise all of the assistance information requested by the UE 120 that may be available to server 150. The assistance data transferred in block 25 may include the OTDOA assistance data defined in LPP/LPPe and may also include antenna switching and PAP assistance information.

The UE 120 may then measure RSTDs between a reference cell and multiple neighbor cells based on the OTDOA assistance data received in block 25. In some embodiments, UE 120 may utilize antenna switching information included in the assistance data to determine the RSTDs as described above. For example, if antenna switching is used on a particular cell, the UE 120 may determine a set of TOA values for each cell, and select a final TOA from this set for RSTD calculation.

If the assistance data received in block 25 indicates a multi-PRS sequence and frequency shift, the UE 120 may then determine a replica PRS sequence for TOA estimation by using the seed of equation (3) or (4) accordingly. In some embodiments, $f(PAP_h)$ in equation (3) or (4) may be included in the assistance data received in block 25, together with other OTDOA assistance data such as PCI etc.

Once UE 120 has determined all measurements as requested by the server 150 in block 23, such as RSTD measurements for example, it may send the measurements in an LPP/LPPe Provide Location Information message to server 150 in block 26. The LPP/LPPe Provide Location Information message in block 26 may include the RSTD measurements together with an identification of the measured cells, such as the PCI and the $f(PAP_h)$ for which the RSTDs are provided. In some embodiments, server 150 may use the received measurements along with information of the antenna locations from which the UE has performed the measurements as well as BS timing information to calculate the location of UE 120. Server 150 may then provide the calculated location of UE 120 to LCS client 160, for example (not shown in FIG. 2D).

In some embodiments, UE 120 may use the measurements together with information of the antenna locations from which the UE 120 has performed the measurements as well as BS timing information to calculate the location of UE 120 and possibly report the estimated location to server 150. In some embodiments, server 150 may provide the UE location information to LCS client 160.

Figure 3A:
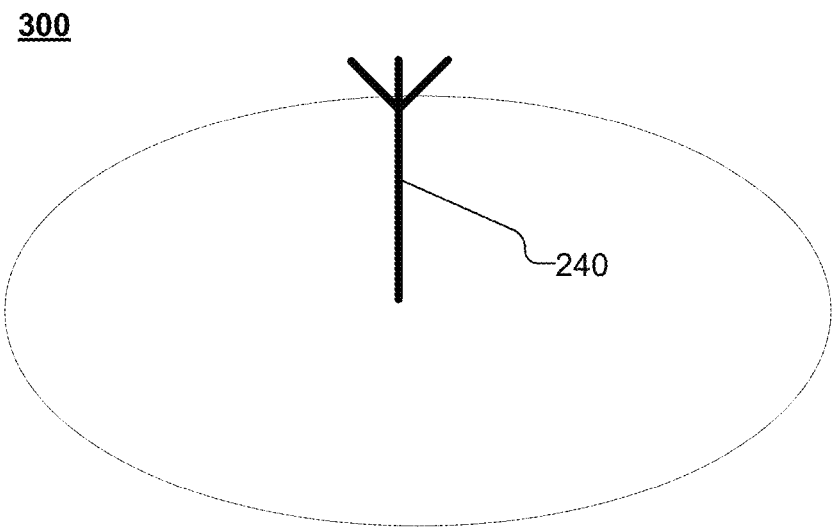
FIG. 3A shows a traditional single physical transmitting antenna element system with a single physical transmitting antenna element radiating at high power.
Figure 3B:
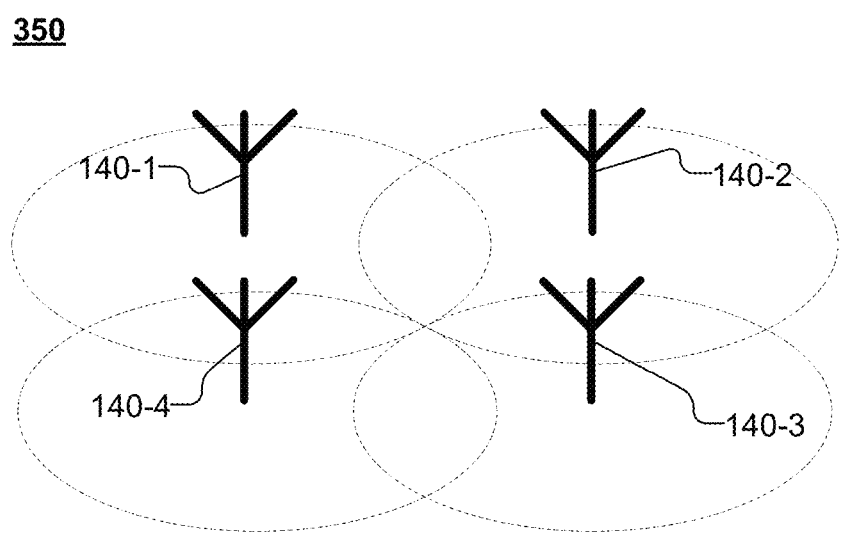
FIG. 3B illustrates exemplary multiple transmit antenna system with four physical transmitting antenna elements.

FIG. 3A shows a traditional single physical transmitting antenna element system 300 with conventional single physical transmitting antenna element 240 radiating at high power. Conventional single physical transmitting antenna element 240 may provide coverage for a single cell/PCI. Conventional techniques using PRS and OTDOA measurements may be utilized by UE 120 for location determination in traditional single physical transmitting antenna element system 300.

FIG. 3B illustrates DAS 350 with multiple physical transmitting antenna elements 140-1, 140-2, 140-3 and 140-4. In DAS 350, multiple physical transmitting antenna elements 140-1, 140-2, 140-3 and 140-4, which may be spatially separated and connected to a common source may replace conventional single physical transmitting antenna element 240 and provide coverage for the same cell. In distributed antenna system 350, the transmitted power is split among physical transmitting antenna elements 140, which may be separated in space so as to provide coverage over the same area as conventional single physical transmitting antenna element 240, but with reduced total power and improved reliability. Thus, DAS 350 may be realized by replacing traditional single physical transmitting antenna element system 300 with a group of low-power physical transmitting antenna elements 140-1, 140-2, 140-3 and 140-4 to cover the same area.

In some embodiments, for example as shown in FIG. 3B, where physical transmitting antenna elements 140 represent a DAS with antennas 140-1, 140-2, 140-3 and 140-4, logical antenna port 6, which is used for PRS transmission, may be mapped to Physical Antenna Ports (PAPs), and a PRS sequence may be generated as a function $f(PAP_h)$ of the Physical Antenna Port Identifier (PAP ID). In equations (3) and (4) above the function of PAP ID is denoted by.

Figure 4:
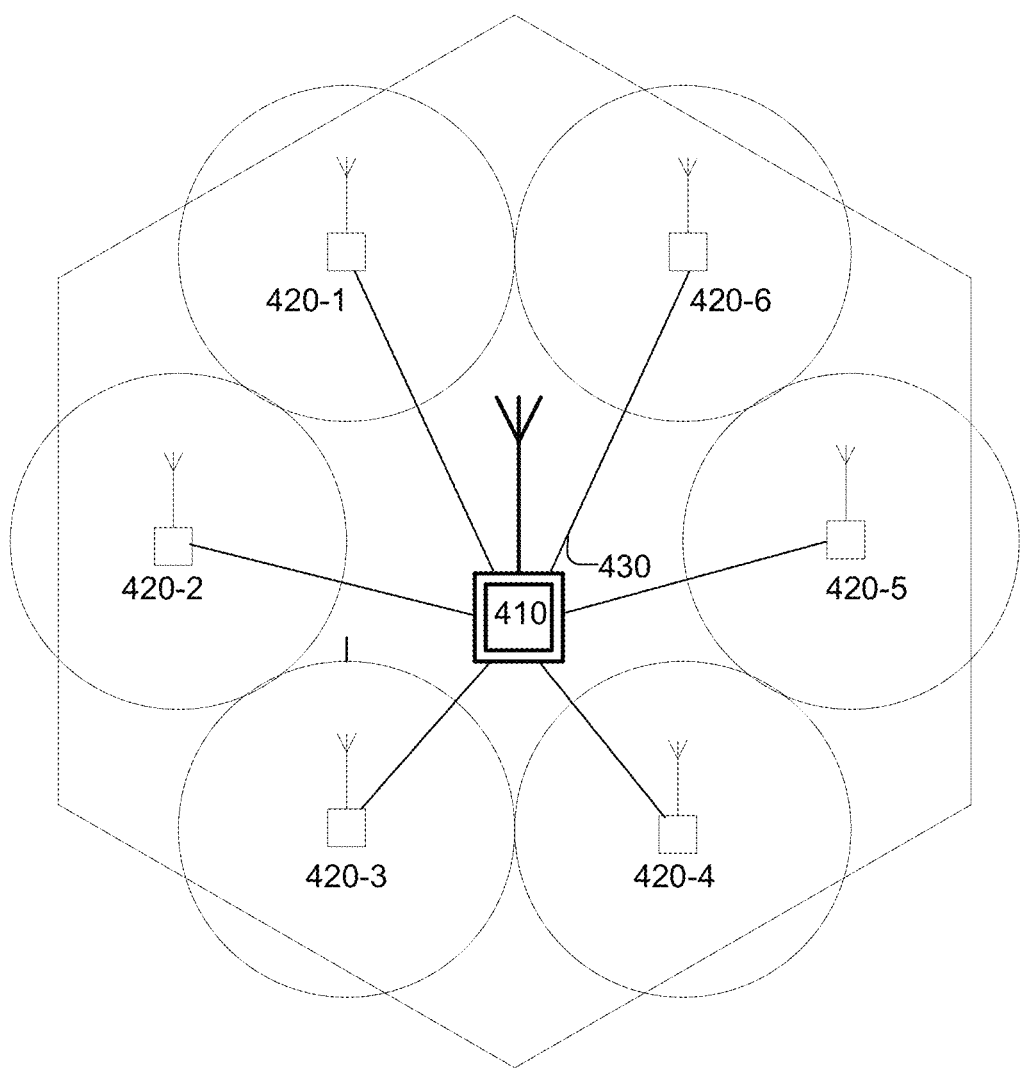
FIG. 4 illustrates an exemplary RRH system with multiple RRH transmitters serving a single cell.

FIG. 4 illustrates an RRH system 400 with multiple RRH transmitters 420-1, 420-2 . . . 420-6 serving a single cell. In RRH system 400, individual RRH transmitters 420-1-420-6 may be remote to eNodeB (BS) 410 and may be coupled to eNodeB 410 using optical connectors 430. Such a situation may also arise, as described earlier, in LTE-Advanced Cooperative Multi Point (CoMP) transmission, where RRHs provide coverage within a macrocell coverage area. In situations where a single or macro cell is served by multiple RRHs or small cells, logical antenna port 6 on the RRHs or small cells may be mapped to PAPs, and a PRS sequence may be generated as a function $f(PAP_h)$ of the PAP ID.

In some embodiments, to permit robust position determination of UE 120 in DAS 350 (FIG. 3B) or RRH system 400 (FIG. 4), logical antenna port 6, which is used for PRS transmissions, may be mapped to Physical Antenna Ports (PAPs), and a PRS sequence may be generated as a function of the PAP ID. Similarly, in situations where a cell is served by multiple RRHs, logical antenna port 6 on the RRHs may be mapped to PAPs, and a PRS sequence may be generated as a function of the PAP ID.

Accordingly, as discussed earlier, the initialization seed $c_{init}$ may be modified as shown in equation (3) as $c_{init} = 2^{10} \cdot (7 \cdot (n_s+1)+l+1) \cdot (2 \cdot N_{ID}^{cell}+1) + 2 \cdot N_{ID}^{cell} + N_{CP} + f(PAP_h)$, or as shown in equation (4) as $c_{init} = 2^{10} \cdot (7 \cdot (n_s+1)+l+1) \cdot (2 \cdot (N_{ID}^{cell}+f(PAP_h))+1) + 2 \cdot (N_{ID}^{cell}+f(PAP_h)) + N_{CP}$. Because $c_{init}$ is a function of the PAP ID $PAP_h$, in some embodiments, a different PRS sequence may be transmitted from each of physical transmitting antenna elements 140-1, 140-2, 140-3 and 140-4 or each RRH despite sharing a common PCI.

Accordingly, as discussed earlier, the frequency shift may be modified as shown in equation (5) above, resulting in a different frequency shift pattern being transmitted from each of physical transmitting antenna elements 140-1, 140-2, 140-3 and 140-4 or each RRH despite sharing a common PCI.

Figure 5A:
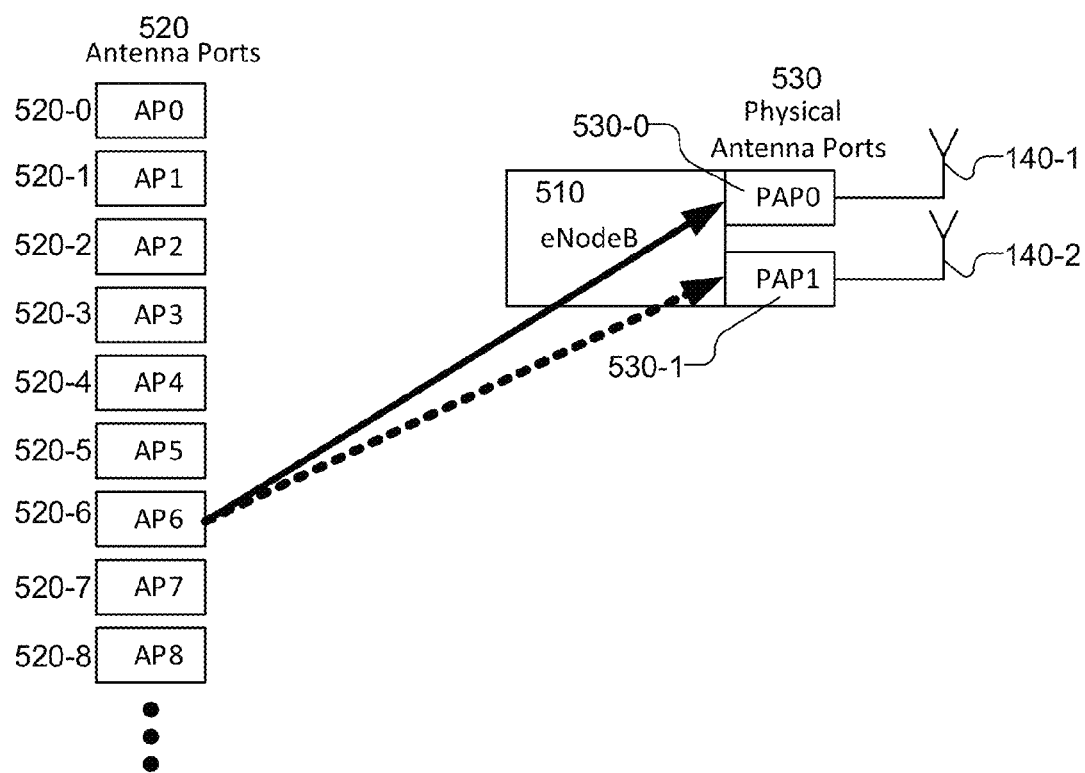
FIG. 5A shows an exemplary mapping of logical antenna port 6 used for PRS transmission in an antenna switching system to Physical Antenna Ports (PAP) with PAP ID 0 and 1.

FIG. 5A shows a mapping 500 of logical Antenna Port 6 520-6 used for PRS transmission in an antenna switching system to Physical Antenna Ports $PAP_0$ 530-0 with PAP ID 0 and $PAP_1$ 530-1 with PAP ID 1. FIG. 5A shows logical antenna ports 520, comprising logical antenna ports 520-1 through 520-8 and physical antenna ports 530. In FIG. 5A, logical antenna port 6 shares the same PCI as eNodeB 510. FIG. 5A assumes that there are two physical transmitting antenna elements 140-1 and 140-2 so that logical antenna port 6 may be mapped to two physical antenna ports 0 and 1 shown as PAP0 530-0 and PAP1 530-1, respectively. In FIG. 5A, $f(PAP_0)$ has been defined simply as $f(PAP_0)=0$ for $PAP_0$ with PAP ID 0, and $f(PAP_1)=1$, for PAP with PAP ID 1. Thus, in FIG. 5A, each physical antenna port 530-0 and 530-1 would transmit a different PRS sequence and frequency shift, even though they share a common PCI. Note that $f(PAP_h)$, as described above, is exemplary and for descriptive purposes only. In general, $f(PAP_h)$ may be set to various mathematical functions of the PAP ID h, such as a linear function, a quadratic function, a polynomial, or any other mathematical function which uses the PAP ID as input value, and provides a defined output value $f(PAP_h)$.

In some embodiments, $f(PAP_h)$ may be integer numbers, counting the number of PAPs of an eNodeB, such as eNodeB 510, e.g., 0, 1, 2, 3, 4, 5 for antenna ports 530-0 to 530-5. In another embodiment, $f(PAP_h)$ may be based on, obtained from, or equal to the Cell Portion ID, for example, as defined in 3GPP Technical Specification 36.455 "LTE Positioning Protocol A (LPPa)", Release-12.

In some embodiments, the PAP IDs may be provided by server 150 to UE 120 as part of the OTDOA assistance data using the appropriate LPP/LPPe protocols. In some embodiments, the OTDOA assistance data may include PAP IDs, or the function $f(PAP_h)$ to allow UE 120 to determine a replica PRS signal for each individual antenna port.

In some embodiments, by mapping logical antenna port 6 to Physical Antenna Ports (PAPs), and generating a PRS sequence and frequency shift as a function of the PAP ID, TX antennas (or RRHs) at different physical locations may be able to transmit distinct PRS signals despite sharing a common PCI.

Figure 5B:
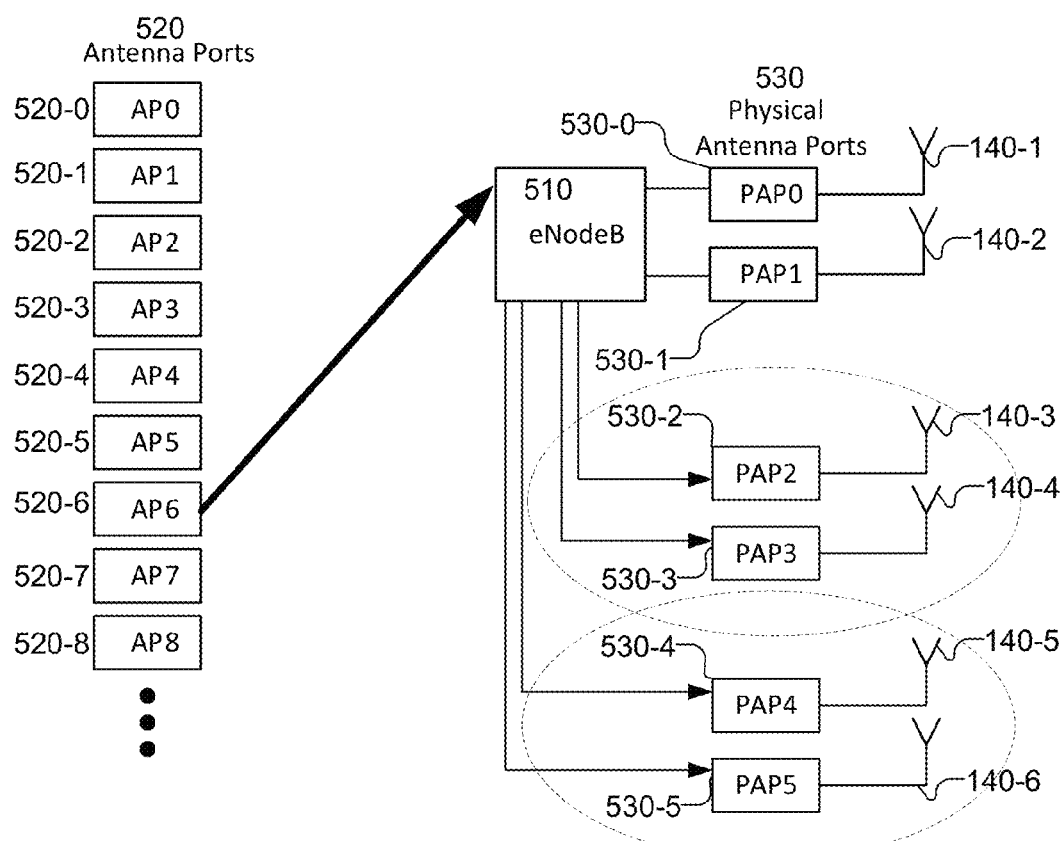
FIG. 5B shows an exemplary mapping of logical antenna Port 6 used for PRS transmission in a DAS or RRH system to Physical Antenna Ports PAP0 through PAP5 with PAP ID 0 through PAP ID 5, respectively.

FIG. 5B shows a mapping 550 of logical antenna port 6 520-6 used for PRS transmission in a DAS or RRH system to physical antenna ports PAP0 530-0 with PAP ID 0 through PAP5 530-5 with PAP ID 5. FIG. 5B shows logical antenna ports 520, comprising logical antenna ports 520-1 through 520-8 and physical antenna ports 530-0 through 530-5. In FIG. 5B, logical antenna port 6 shares the same PCI as eNodeB 510. FIG. 5B assumes that there are six physical transmitting antenna elements 140-1, 140-2 . . . 140-6 at different physical locations. As shown in FIG. 5B, logical antenna port 6 may be mapped to six physical antenna ports 0 through 5 shown as PAP0 530-0 through PAP5 530-5, respectively.

Figure 6A:
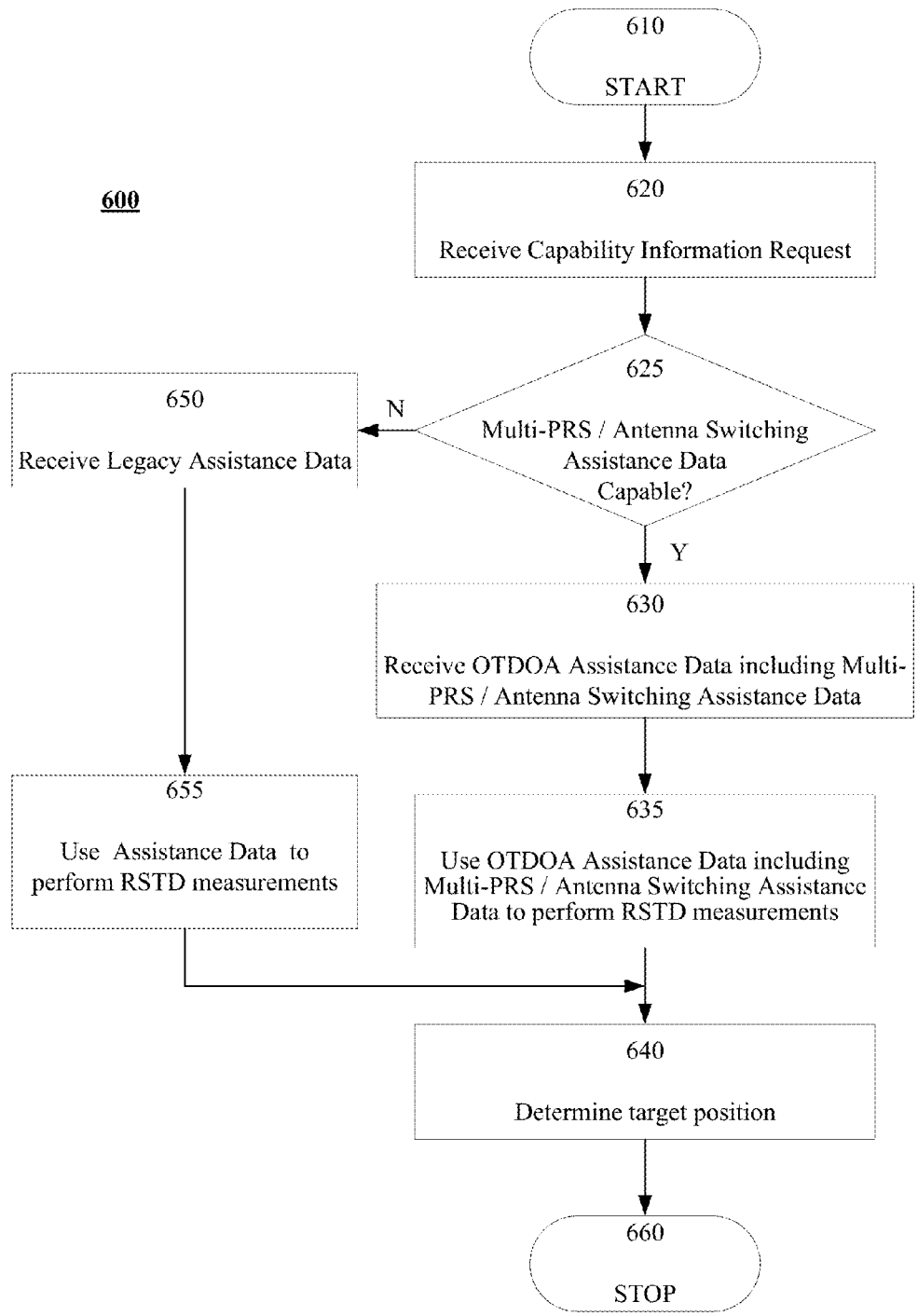
FIG. 6A shows a flowchart for an exemplary method to determine the position of a mobile station in a manner consistent with disclosed embodiments.

FIG. 6A shows a flowchart for an exemplary method 600 to determine the position of a UE 120 in a manner consistent with disclosed embodiments. In some embodiments, portions of method 600 may be performed by UE 120, and/or by some combination of UE 120, server 150, and/or another network entity. The method may start in block 610, for example, when UE 120 initiates location determination and/or when LCS client 160 or another network entity requests location information for UE 120. In some embodiments, portions of method 600 may be performed using an LPP or LLPe protocol.

Next, in block 620, a request for capability information may be received by the UE 120. For example, UE 120 may receive a Request Capabilities message, which may request the capabilities of the UE 120 such as, without limitation, OTDOA capabilities, including capability indication for PAPs and/or support for multi-PRS sequences and frequency shifts from the same cell/PCI.

In block 625, UE 120 may determine, based in part, on stored capability information, whether UE 120 is capable of supporting/receiving OTDOA assistance information pertaining to PAPs, multi-PRS sequences and frequency shifts from the same cell/PCI, and/or antenna switching assistance data. For example, the antenna switching assistance information may include PRS assistance information for one or more cells, which may comprise Boolean parameters corresponding to the one or more cells. Each Boolean parameter may indicate whether antenna switching occurs between PRS positioning occasions for a corresponding cell. In some embodiments, the antenna switching assistance information may also include information pertaining to an antenna switching interval. The antenna switching interval may be specified in terms of the number of consecutive PRS positioning occasions transmitted on a physical transmitting antenna element in the at least one cell before the physical transmitting antenna element is switched.

If UE 120 determines that it is capable of supporting OTDOA assistance information pertaining to PAPs, multi-PRS sequences and frequency shifts from the same cell/PCI, and/or antenna switching assistance data ("Y" in block 630) then, in block 630, UE 120 may receive all of the assistance information requested by the UE 120, which may include the OTDOA assistance data defined in LPP and/or LPPe and may also include assistance information pertaining to multi-PRS sequences and frequency shifts from the same cell/PCI, antenna switching assistance data, and/or PAP assistance information.

In block 635, UE 120 may measure RSTDs between a reference cell and multiple neighbor cells based on the OTDOA assistance data. In some embodiments, UE 120 may utilize the antenna switching information included in the assistance data to determine the RSTDs as described above. In one embodiment, if antenna switching is used on a particular cell, UE 120 may determine a set of TOA values for each cell, and select one TOA from this set for RSTD calculation. For example, if antenna switching is used by the at least one cell, then, UE 120 may select a Time of Arrival value for a PRS from a set of TOA values determined based on PRS related measurements at the UE during a single PRS positioning occasion. In some embodiments, the selected TOA value may be indicative of a shorter distance between a source of the PRS and the UE 120 than the other TOA values in the set.

If UE 120 determines that it is not capable of supporting OTDOA assistance information pertaining to PAPs, multi-PRS sequences and frequency shifts from the same cell/PCI, and/or antenna switching assistance data etc. ("N" in block 630) then, in block 650, in some embodiments, UE 120 may receive legacy assistance information. For example, in some embodiments, UE 120 may receive information pertaining to a physical transmitting antenna element that maintains a PRS sequence unmodified by $f(PAP_h)$, which may be achieved by setting $f(PAP)=0$. For example, UE 120 may be provided with information pertaining to physical antenna port $PAP_0$, for which $f(PAP)=0$. Next, in block 655, UE 120 may measure RSTDs based on the legacy assistance information received in block 650.

In some embodiments, the position of UE 120 may then be determined in block 640 using the measured RSTD information. In some embodiments, UE 120 may compute its own location. In another embodiment, the position of UE 120 may be computed by server 150 based on the measured RSTD information. The method may terminate in block 660. Method 600 is exemplary and various modifications may be made by combining or omitting blocks as would be apparent to one of ordinary skill in the art. For example, in some embodiments, such as where no legacy support is provided, blocks 650 and 655 may be omitted and the method may proceed to block 660, where it terminates. As another example, the method may be modified depending on the protocol used for location assistance, the capabilities of UE 120, and/or capabilities of server 150.

Figure 6B:
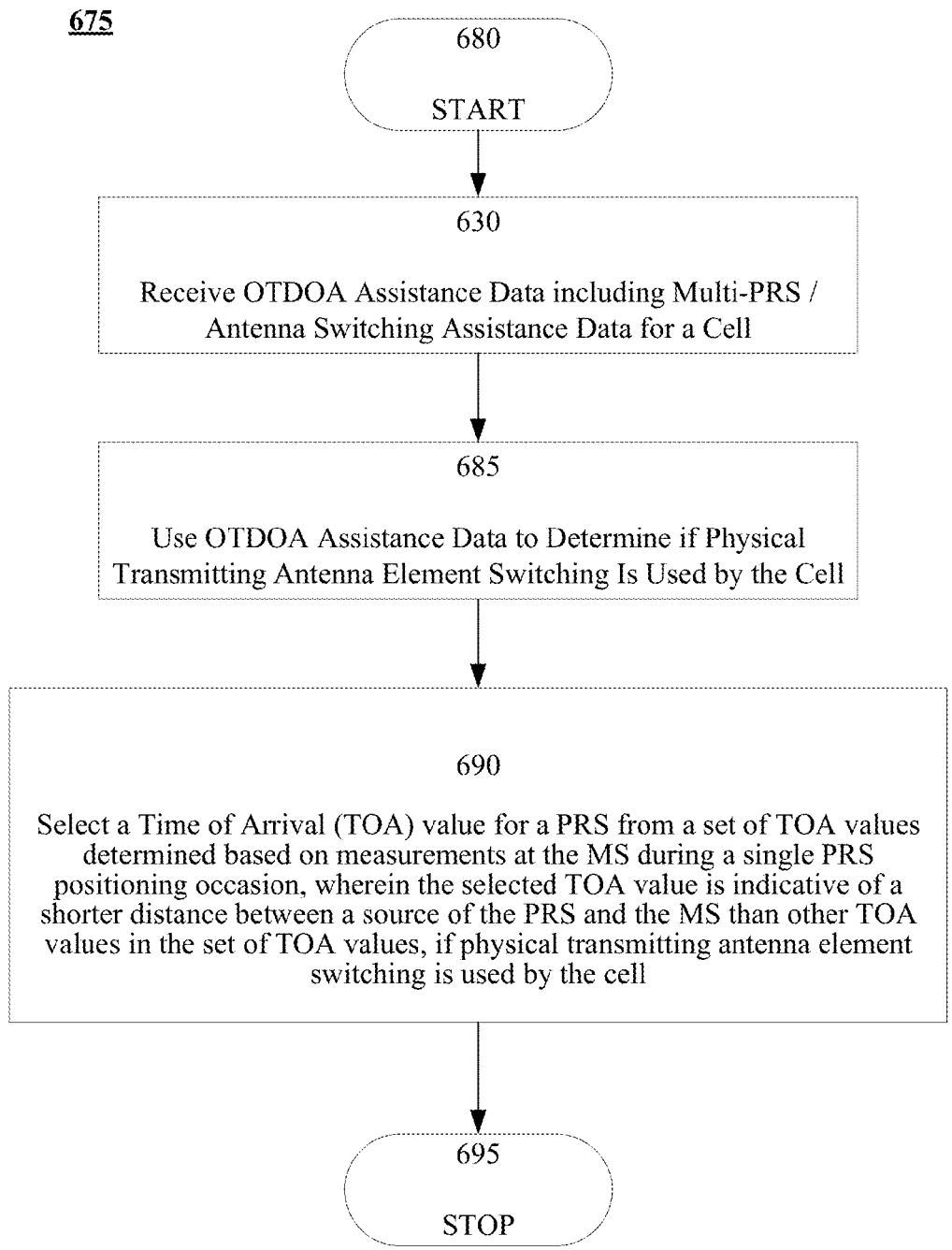
FIG. 6B shows a flowchart for an exemplary method to determine the position of a mobile station in a manner consistent with disclosed embodiments.

FIG. 6B shows a flowchart for another exemplary method 675 to determine the position of a UE 120 in a manner consistent with disclosed embodiments. In some embodiments, portions of method 675 may be performed by UE 120. The method may start in block 680, for example, when UE 120 initiates location determination and/or when LCS client 160 or another network entity requests location information for UE 120. In some embodiments, portions of method 675 may be performed using an LPP or LLPe protocol.

Next, in block 630, UE 120 may receive all of the assistance information requested by the UE 120, which may include the OTDOA assistance data defined in LPP and/or LPPe and may also include assistance information pertaining to multi-PRS sequences and frequency shifts from the same cell/PCI, antenna switching assistance data, and/or PAP assistance information. For example, UE 120 may receive the OTDOA assistance information, which may comprise Positioning Reference Signal (PRS) assistance information including antenna switching assistance information for a cell.

In block 685, UE 120 may determine whether physical transmitting antenna element switching is used by the cell based, at least in part, on the received antenna switching assistance information.

Next, in block 690, if physical transmitting antenna element switching is used by the cell, then, UE 120 may select a Time of Arrival (TOA) value for a PRS from a set of TOA values determined based on measurements at the UE during a single PRS positioning occasion, where the PRS is received by the UE and the selected TOA value is indicative of a shorter distance between a source of the PRS and the UE than other TOA values in the set of TOA values. In some embodiments, the selected TOA value may be used to determine an estimated location of UE 120. The method may terminate in block 660.

Figure 7A:
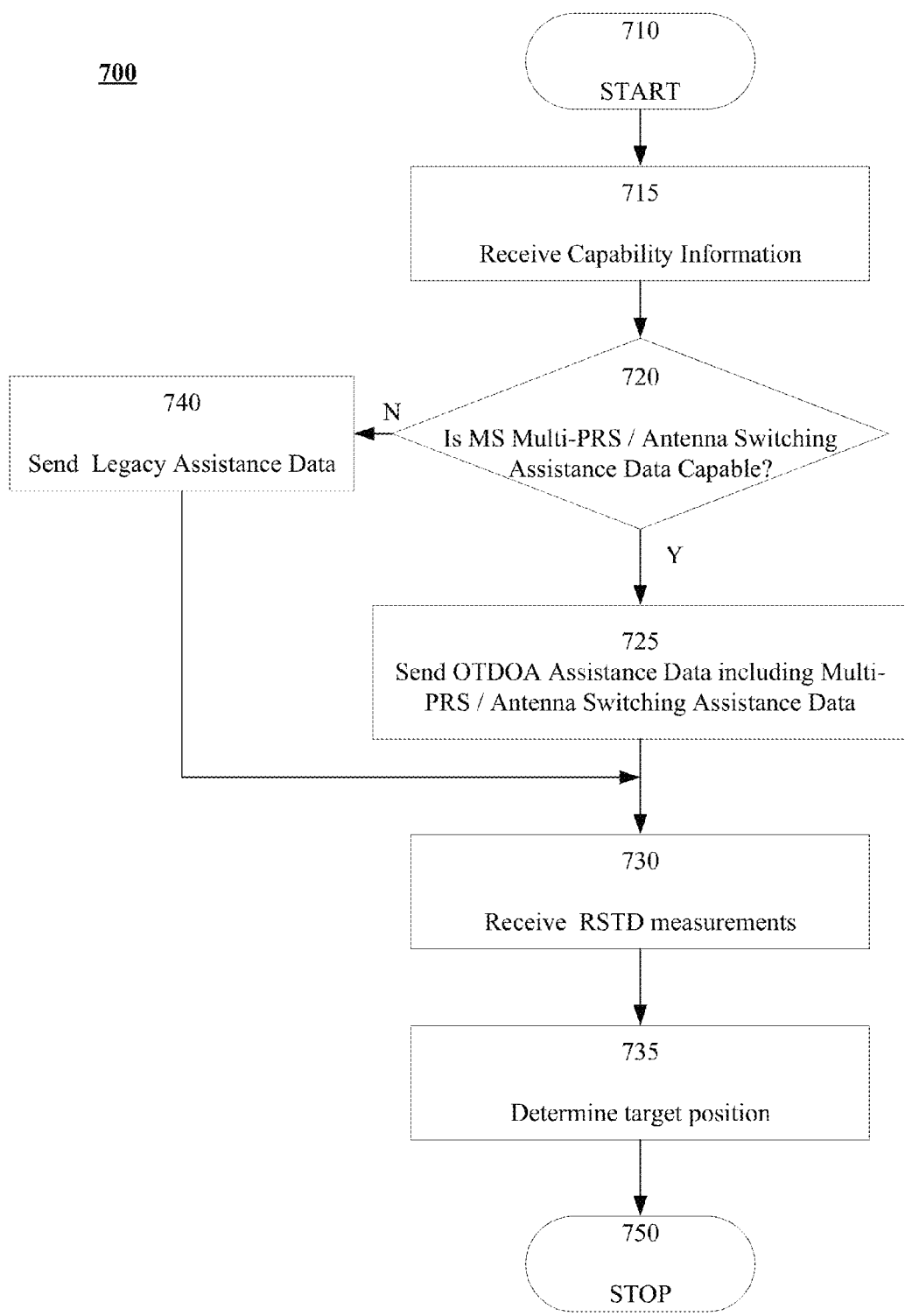
FIG. 7A shows a flowchart for an exemplary method to determine the position of a mobile station in a manner consistent with disclosed embodiments.

FIG. 7A shows a flowchart for an exemplary method 700 to determine the position of UE 120 in a manner consistent with disclosed embodiments. In some embodiments, portions of method 700 may be performed by a server 150. The method may start in block 710, for example, when server 150 or UE 120 initiates location determination and/or when LCS client 160 or another network entity requests location information for UE 120. In some embodiments, portions of method 700 may be performed using an LPP or LLPe protocol.

Next, in block 715, server 150 may receive capability information from UE 120. In some embodiments, the capability information may be received in a Provide Capabilities message, in response to an earlier Request Capabilities message sent by server 150. In some embodiments, the capability information received by server 150 may include, without limitation, information pertaining to mobile station's OTDOA capabilities, including an indication of support for PAPs, antenna switching assistance information, and/or support for multi-PRS sequences and frequency shifts from the same cell/PCI.

In block 720, server 150 may determine, based in part, on the received capability information, whether UE 120 is capable of supporting/receiving OTDOA assistance information pertaining to PAPs, multi-PRS sequences and frequency shifts from the same cell/PCI, and/or antenna switching assistance data.

If server 150 determines that UE 120 is capable of supporting OTDOA assistance information pertaining to PAPs, multi-PRS sequences and frequency shifts from the same cell/PCI, and/or antenna switching assistance data ("Y" in block 720) then, in block 725, server 150 may send all of the assistance information requested by UE 120, which may include the OTDOA assistance data defined in LPP and/or LPPe and may also include assistance information pertaining to multi-PRS sequences and frequency shifts from the same cell/PCI, antenna switching assistance data, and/or PAP assistance information. In some embodiments, server 150 may transmit the PAP ID as part of OTDOA assistance information. Further, the PAP ID may be transmitted as part of OTDOA assistance information based, in part, on received information indicating a capability to generate a replica PRS sequence at UE 120 in communication with server 150 (e.g. a location server). In some embodiments, the location assistance information may be transmitted in a Provide Assistance Data message to UE 120.

If server 150 determines that UE 120 does not support OTDOA assistance information pertaining to PAPs, multi-PRS sequences and frequency shifts from the same cell/PCI, and/or antenna switching assistance data ("N" in block 720) then, in block 740, in some embodiments, server 150 may send legacy assistance information to UE 120. For example, in some embodiments, server 150 may send information pertaining to a physical transmitting antenna element that maintains a PRS sequence unmodified by $f(PAP_h)$, which may be achieved by setting $f(PAP)=0$. For example, server 150 may send information pertaining to physical antenna port $PAP_0$, for which $f(PAP)=0$.

Next, in block 730, server 150 may receive RSTDs measured by UE 120 based on the provided assistance information. In block 735, the location of UE 120 may be determined based on the measured RSTDs. For example, if antenna switching is used on a particular cell, server 150 may receive one TOA value from a set of measured TOA based on the OTDOA assistance information provided.

In some embodiments, the position of UE 120 may then be determined in block 735 using the measured RSTD information. In some embodiments, UE 120 may compute its own location and relay the location to server 150. In another embodiment, the position of UE 120 may be computed by server 150 based on the measured RSTD information. The method may then terminate in block 750.

Method 700 is exemplary and various modifications may be made by combining or omitting blocks as would be apparent to one of ordinary skill in the art. For example, in some embodiments, such as where no legacy support is provided, block 740 may be omitted and the method may proceed to block 750, where it terminates. As another example, the method may be modified depending on the protocol used for location assistance, the capabilities of UE 120, and/or capabilities of the location assistance server.

Figure 7B:
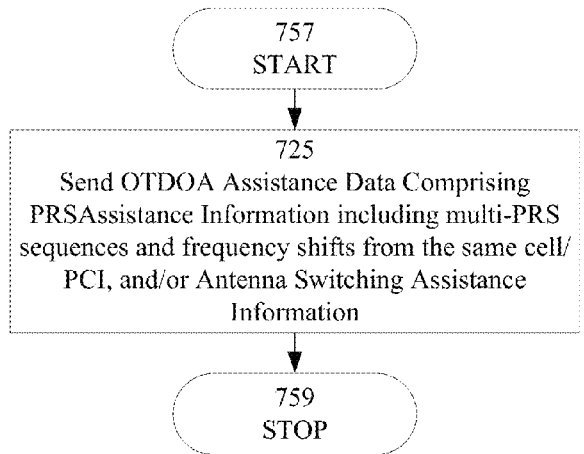
FIG. 7B shows a flowchart for an exemplary method that may be used during a location estimation procedure in a manner consistent with disclosed embodiments.

FIG. 7B shows a flowchart for an exemplary method 755 that may be used during location estimation in a manner consistent with disclosed embodiments. In some embodiments, portions of method 755 may be performed by a server 150. The method may start in block 757, for example, when server 150 or UE 120 initiates location determination and/or when LCS client 160 or another network entity requests location information for UE 120. In some embodiments, portions of method 755 may be performed using an LPP or LLPe protocol.

Next, in block 725, server 150 may send all of the assistance information requested by UE 120, which may include the OTDOA assistance data defined in LPP and/or LPPe and may also include assistance information pertaining to multi-PRS sequences and frequency shifts from the same cell/PCI, antenna switching assistance data, and/or PAP assistance information. For example, server 150 may send OTDOA assistance information to UE 120, where the OTDOA assistance information may comprise Positioning Reference Signal (PRS) assistance information including antenna switching assistance information for at least one cell in a subset of cells served by the server 150. The term "subset" as used herein, refers to one or more elements of a set. In some instances the subset may comprise a plurality of elements of a set. In some instances, a subset may include all of the elements of a set. The method may then terminate in block 759.

Figure 7C:
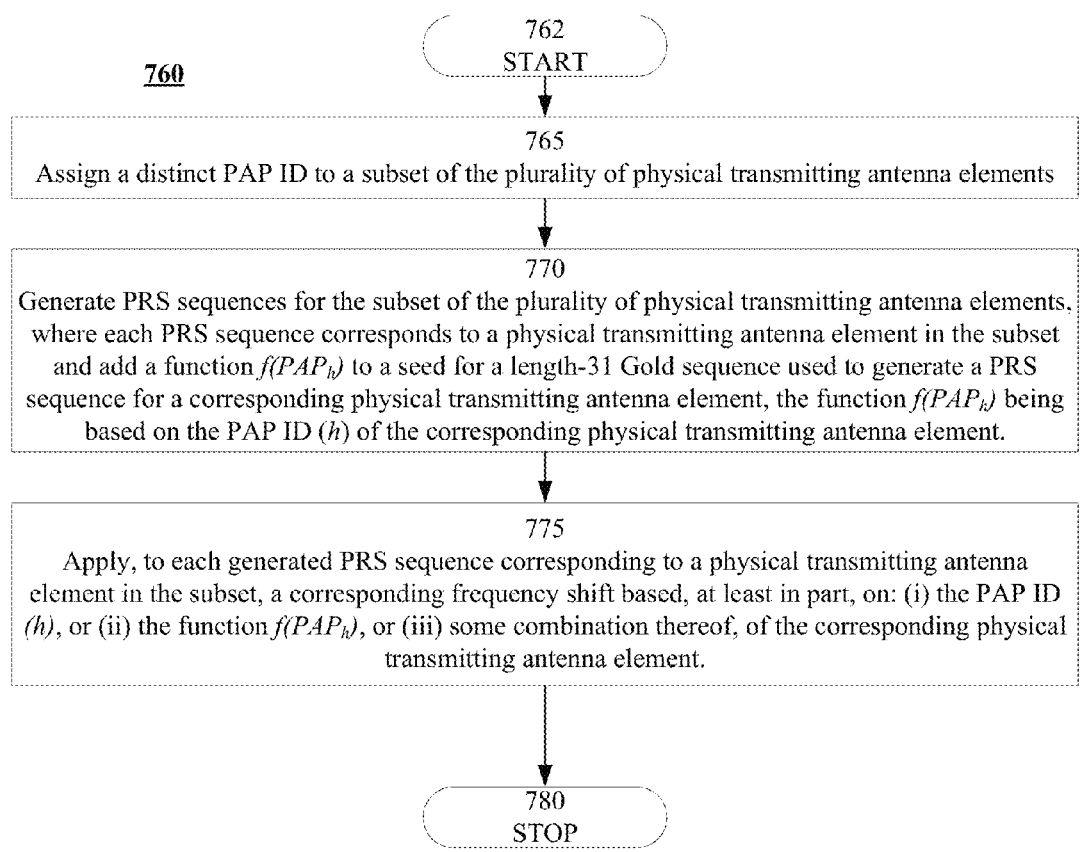
FIG. 7C shows an exemplary method of generating distinct PRS sequences in a system comprising a plurality of physical transmitting antenna elements.

FIG. 7C shows an exemplary method 760 of generating distinct PRS sequences and frequency shifts in a system comprising a plurality of physical transmitting antenna elements. In some embodiments, portions of method 760 may be performed by an entity within system 100 to determine a particular radio network configuration. The method may start in block 762, for example, when the radio network is being set-up, planned, configured, or re-configured.

Next, in block 765, system 100 and/or an entity in system 100 may assign a distinct PAP ID to a subset of the plurality of physical transmitting antenna elements.

In block 770, the radio network may generate PRS sequences for the subset of the plurality of physical transmitting antenna elements, where each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on the PAP ID (h) of the corresponding physical transmitting antenna element.

In block 775, the radio network may apply, to each generated PRS sequence (e.g. in block 765) corresponding to a physical transmitting antenna element in the subset, a corresponding frequency shift based, at least in part, on: (i) the PAP ID (h), or (ii) the function $f(PAPh)$, or (iii) some combination thereof, of the corresponding physical transmitting antenna element.

In some embodiments, blocks 770 and 775 may be combined so that the radio network may generate PRS sequences and frequency shifts for the subset of the plurality of physical transmitting antenna elements, where each PRS sequence and frequency shift corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, and a function $f(PAP_h)$ may be added to the formula for generating the PRS pattern frequency shift, where the function $f(PAP_h)$ being based on the PAP ID (h) of the corresponding physical transmitting antenna element. The method may terminate in block 780.

Figure 7D:
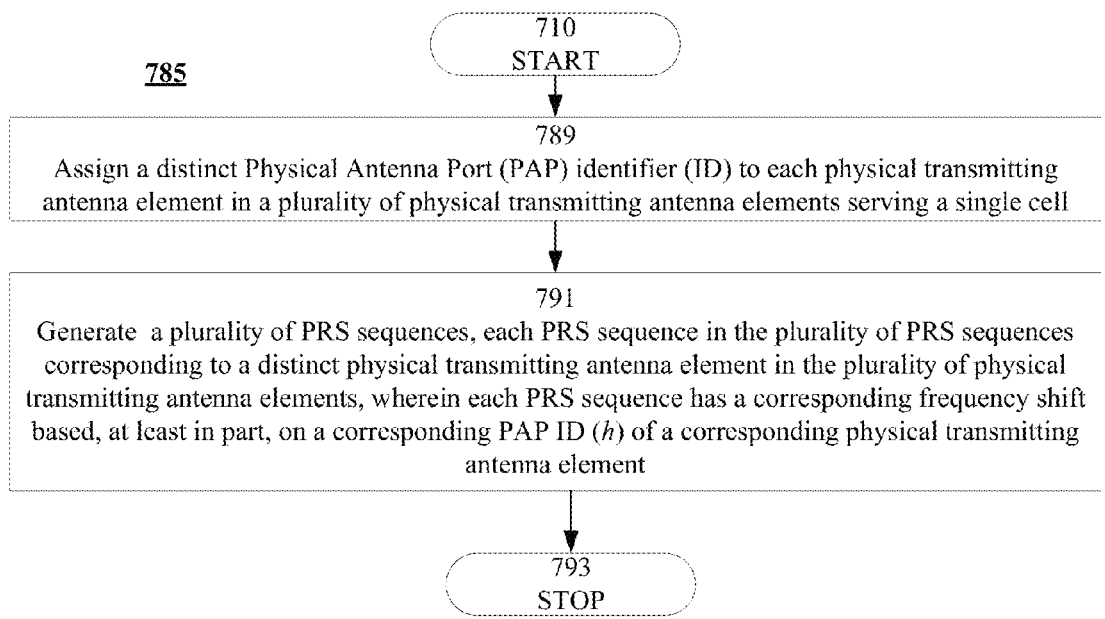
FIG. 7D shows an exemplary method of generating distinct PRS sequences with frequency shifts in a system comprising a plurality of physical transmitting antenna elements serving a single cell.

FIG. 7D shows an exemplary method 785 of generating distinct PRS sequences with frequency shifts in a system comprising a plurality of physical transmitting antenna elements, which may serve a single cell. In some embodiments, portions of method 785 may be performed by an entity within system 100 to determine a particular radio network configuration. The method may start in block 710, for example, when the radio network is being set-up, planned, configured, or re-configured.

Next, in block 789, system 100 and/or an entity in system 100 may assign a distinct PAP ID to each physical transmitting antenna element in the plurality of physical transmitting antenna element.

In block 791, the radio network may generate plurality of PRS sequences, where each PRS sequence in the plurality of PRS sequences corresponds to a distinct physical transmitting antenna element in the plurality of physical transmitting antenna elements, and wherein each PRS sequence has a corresponding frequency shift based, at least in part, on a corresponding PAP ID (h) of a corresponding physical transmitting antenna element.

In some embodiments, the frequency shift may be based on a function $f(PAP_h)$ obtained from the PAP ID (h) of the corresponding physical transmitting antenna element. In some embodiments, $f(PAP_h)$ may be set to 0 for at least one of the plurality of physical transmitting antenna elements in the subset of the plurality of physical transmitting antenna elements. Further, in some embodiments, $f(PAP_h)$ may be based on a Cell Portion ID, wherein the Cell Portion ID comprises an identifier associated with a geographic portion of a cell.

In some embodiments, the plurality of physical transmitting antenna elements may comprise a Distributed Antenna System (DAS). In some embodiments, the plurality of physical transmitting antenna elements may be realized using Remote Radio Heads (RRHs). In some embodiments, the plurality of physical transmitting antenna elements comprise a small cell, such as, but not limited to, a femtocell.

In some embodiments, the PAP ID and/or $f(PAP_h)$ may be transmitted as part of Observed Time Difference of Arrival (OTDOA) assistance information. In some instances, transmission of the PAP ID and/or $f(PAP_h)$ as OTDOA assistance data may be based, at least in part, on received information indicating a capability to receive the OTDOA assistance data at a mobile station. The method may terminate in block 780.

Figure 8:
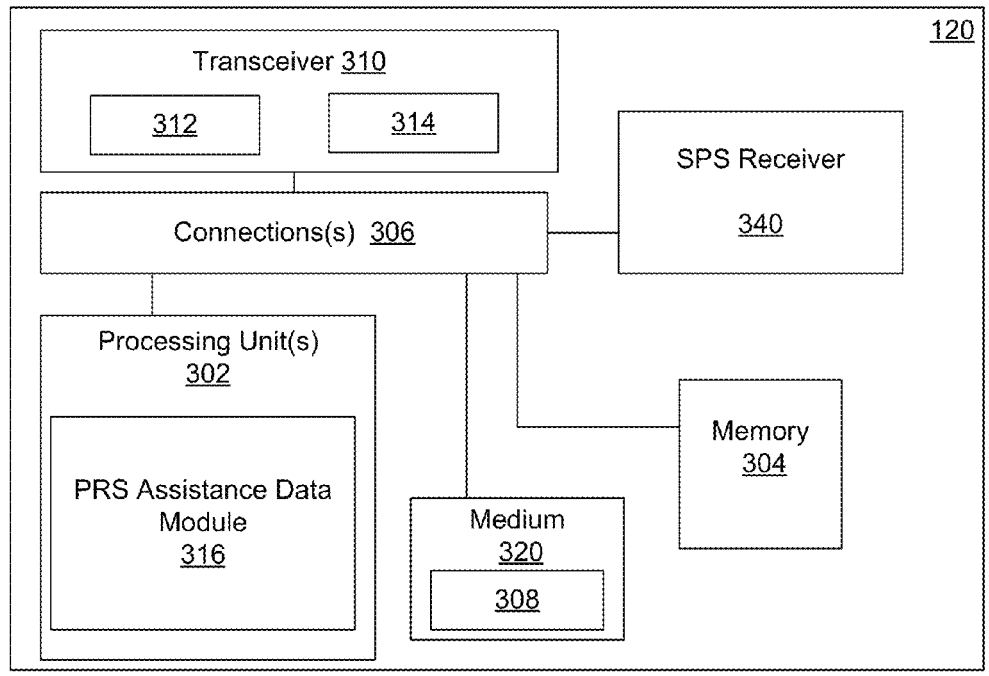
FIG. 8 is a schematic block diagram of a mobile station capable of receiving location assistance messages and supporting location determination in a manner consistent with disclosed embodiments.

FIG. 8 shows a schematic block diagram illustrating certain exemplary features of UE 120 enabled to support OTDOA measurement using PRS assistance information in systems with antenna diversity, DAS, and/or RRHs or small cells in a manner consistent with disclosed embodiments. UE 120 may, for example, include one or more processing units 302, memory 304, a transceiver 310 (e.g., wireless network interface), and (as applicable) an SPS receiver 340, which may be operatively coupled with one or more connections 306 (e.g., buses, lines, fibers, links, etc.) to non-transitory computer-readable medium 320 and memory 304. In certain example implementations, all or part of UE 120 may take the form of a chipset, and/or the like. The SPS receiver 340 may be enabled to receive signals associated with one or more SPS resources. Transceiver 310 may, for example, include a transmitter 312 enabled to transmit one or more signals over one or more types of wireless communication networks and a receiver 314 to receive one or more signals transmitted over the one or more types of wireless communication networks.

Processing unit 302 may be implemented using a combination of hardware, firmware, and software. In some embodiments, processing unit 302 may include UE PRS Assistance Data Module 316, which may process received OTDOA assistance information, including PRS assistance information. For example, UE PRS Assistance Data Module 316 may process PRS assistance information comprising antenna switching assistance information including antenna switching pattern information and antenna muting information. In some embodiments, UE PRS Assistance Data Module 316 may also process PAP IDs, and/or the function $f(PAP_n)$ received as part of OTDOA assistance information. Processing unit 302 may also be capable of processing various other received LPP/LPPe messages including assistance information either directly or in conjunction with one or more other functional blocks shown in FIG. 8. In some embodiments, processing unit 302 may represent one or more circuits configurable to perform at least a portion of a data signal computing procedure or process related to the operation of UE 120.

In some embodiments, UE 120 may include one or more UE antennas (not shown) which may be internal or external. UE antennas may be used to transmit and/or receive signals processed by transceiver 310 and/or SPS receiver 340. In some embodiments, UE antennas may be coupled to transceiver 310 and SPS receiver 340. In some embodiments, measurements of signals received (transmitted) by UE 120 may be performed at the point of connection of the UE antennas and transceiver 310. For example, the measurement point of reference for received (transmitted) RF signal measurements may be an input (output) terminal of the receiver 314 (transmitter 312) and an output (input) terminal of the UE antennas. In an UE 120 with multiple UE antennas or antenna arrays, the antenna connector may be viewed as a virtual point representing the aggregate output (input) of multiple UE antennas. In some embodiments, UE 120 may measure received signals including signal strength and TOA measurements and the raw measurements may be processed by processing units 302.

The methodologies described herein may be implemented by various means depending upon the application. For example, these methodologies may be implemented in hardware, firmware, software, or any combination thereof. For a hardware implementation, the processing unit 302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 320 or memory 304 that is connected to and executed by processing unit 302. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 308 on a non-transitory computer-readable medium, such as medium 320 and/or memory 304. Examples include computer-readable media encoded with a data structure and computer-readable media encoded with a computer program. For example, the non-transitory computer-readable medium including program code 308 stored thereon may include program code 308 to support OTDOA measurement using PRS assistance information in systems with antenna diversity, DAS, and/or RRHs in a manner consistent with disclosed embodiments. Non-transitory computer-readable media includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code 308 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 320, instructions and/or data may be provided as signals on transmission media included in a communication apparatus. For example, a communication apparatus may include a transceiver 310 having signals indicative of instructions and data. The instructions and data are configured to cause one or more processors to implement the functions outlined in the claims. That is, the communication apparatus includes transmission media with signals indicative of information to perform disclosed functions.

Memory 304 may represent any data storage mechanism. Memory 304 may include, for example, a primary memory and/or a secondary memory. Primary memory may include, for example, a random access memory, read only memory, etc. While illustrated in this example as being separate from processing unit 302, it should be understood that all or part of a primary memory may be provided within or otherwise co-located/coupled with processing unit 302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 320. As such, in certain example implementations, the methods and/or apparatuses presented herein may take the form in whole or part of a computer-readable medium 320 that may include computer implementable instructions 308 stored thereon, which if executed by at least one processing unit 302 may be operatively enabled to perform all or portions of the example operations as described herein. Computer readable medium 320 may be a part of memory 304.

Figure 9:
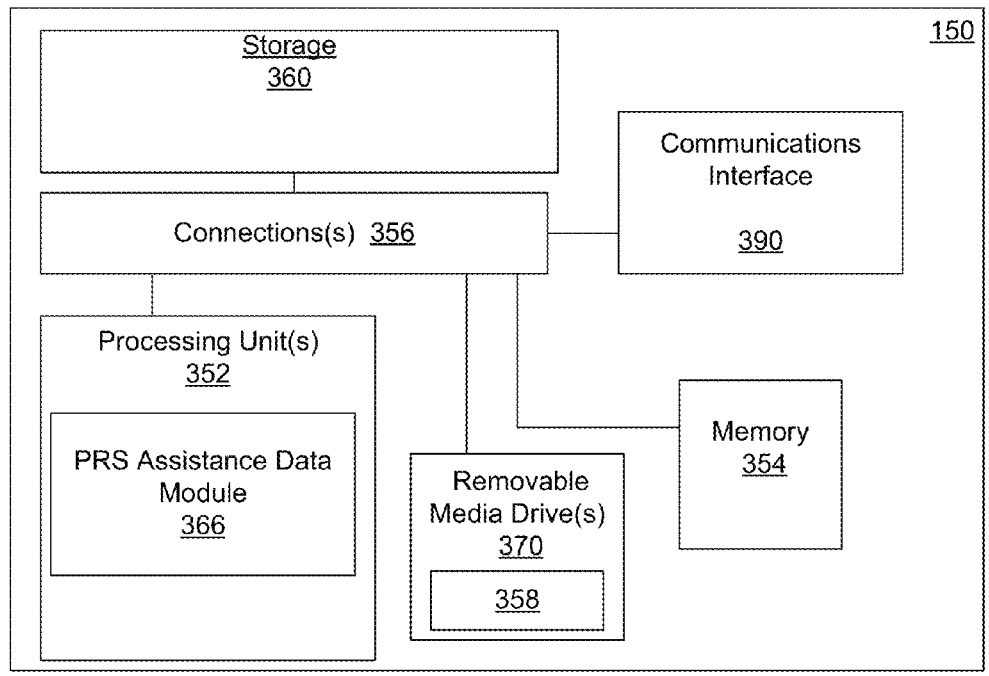
FIG. 9 is a schematic block diagram illustrating an apparatus such as an exemplary server enabled to support the location determination.

Reference is now made to FIG. 9, which is a schematic block diagram illustrating a server 150 enabled to support OTDOA measurement using PRS assistance information in systems with antenna diversity, DAS, and/or RRHs or small cells in a manner consistent with disclosed embodiments. In some embodiments, server 150 may include, for example, one or more processing units 352, memory 354, storage 360, and (as applicable) communications interface 390 (e.g., wireline or wireless network interface), which may be operatively coupled with one or more connections 356 (e.g., buses, lines, fibers, links, etc.). In certain example implementations, some portion of server 150 may take the form of a chipset, and/or the like.

Communications interface 390 may include a variety of wired and wireless connections that support wired transmission and/or reception and, if desired, may additionally or alternatively support transmission and reception of one or more signals over one or more types of wireless communication networks. Communications interface 390 may also include interfaces for communication with various other computers and peripherals. For example, in one embodiment, Communications interface 390 may comprise network interface cards, input-output cards, chips and/or ASICs that implement one or more of the communication functions performed by server 150. In some embodiments, communications interface 390 may also interface with network 130 to obtain a variety of network configuration related information, such as PCIs, configured PRS information, and/or timing information used by the base stations in the network. For example, Communications interface 390 may make use of the "LTE Positioning Protocol A (LPPa)" defined in 3GPP TS 36.455 or a modification of this protocol to obtain PCI, configured PRS, timing and/or other information from the base stations in network 130. Processing unit 352 may use some or all of the received information to generate OTDOA assistance data information in a manner consistent with disclosed embodiments.

Processing unit 352 may be implemented using a combination of hardware, firmware, and software. In some embodiments, processing unit 352 may include Server PRS Assistance Data Module 366, which may generate OTDOA information, including PRS assistance information for transmission to UE 120. For example, Server PRS Assistance Data Module 366 may generate and/or format PRS assistance information comprising antenna switching assistance information and antenna switching pattern information. In some embodiments, Server PRS Assistance Data Module 366 may also generate PAP IDs, or the function $f(PAP_n)$ as part of OTDOA assistance information for transmission to UE 120. Processing unit 352 may also be capable of processing various other LPP/LPPe assistance information either directly or in conjunction with one or more other functional blocks shown in FIG. 9. In some embodiments, processing unit 352 may generate the OTDOA assistance information as Long Term Evolution (LTE) Positioning Protocol (LPP) or LPP extensions (LPPe) messages. In some embodiments, processing unit 352 may represent one or more circuits configurable to perform at least a portion of a data signal computing procedure or process related to the operation of server 150.

The methodologies described herein in flow charts and message flows may be implemented by various means depending upon the application. For example, these methodologies may be implemented in hardware, firmware, software, or any combination thereof. For a hardware implementation, the processing unit 352 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in removable media drive 370, which may support the use of non-transitory computer-readable media 358, including removable media. Program code may be resident on non-transitory computer readable media 358 or memory 354 and may be read and executed by processing units 352. Memory may be implemented within processing units 352 or external to the Processing units 352. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 358 and/or memory 354. Examples include computer-readable media encoded with a data structure and computer-readable media encoded with a computer program. For example, non-transitory computer-readable medium 358 including program code stored thereon may include program code to support OTDOA measurement using PRS assistance information in systems with antenna diversity, DAS, and/or RRHs or small cells in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 390, which may store the instructions/data in memory 354, storage 360 and/or relayed the instructions/data to processing units 352 for execution. For example, communications interface 390 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 354 may represent any data storage mechanism. Memory 354 may include, for example, a primary memory and/or a secondary memory. Primary memory may include, for example, a random access memory, read only memory, non-volatile RAM, etc. While illustrated in this example as being separate from processing unit 352, it should be understood that all or part of a primary memory may be provided within or otherwise co-located/coupled with processing unit 352. Secondary memory may include, for example, the same or similar type of memory as primary memory and/or storage 360 such as one or more data storage devices including, for example, hard disk drives, optical disc drives, tape drives, a solid state memory drive, etc. In some embodiments, storage 360 may comprise one or more databases that may hold information pertaining to various entities in system 100 and/or the broader cellular network. In some embodiments, information in the databases may be read, used and/or updated by processing units 352 during various computations, including storing capabilities of MS 120, capabilities of server 150, generating OTDOA assistance data, computing a location of UE 120, etc.

In certain implementations, secondary memory may be operatively receptive of, or otherwise configurable to couple to a non-transitory computer-readable medium 358. As such, in certain example implementations, the methods and/or apparatuses presented herein may take the form in whole or part of a removable media drive 370 that may include non-transitory computer readable medium 358 with computer implementable instructions stored thereon, which if executed by at least one processing unit 352 may be operatively enabled to perform all or portions of the example operations as described herein. Computer readable medium 358 may be a part of memory 354.

Although the present description is illustrated in connection with specific embodiments for instructional purposes, claimed subject matter is not necessarily limited thereto. Various adaptations and modifications may be made without departing from the scope of the description.

What is claimed is:

1. A processor-implemented method of, generating Positioning Reference Signal (PRS) sequences, the method comprising:
   assigning a distinct Physical Antenna Port (PAP) identifier (ID) to each physical transmitting antenna element in a plurality of physical transmitting antenna elements serving a single cell; and
   generating a plurality of distinct PRS sequences, each distinct PRS sequence in the plurality of PRS sequences corresponding to a distinct physical transmitting antenna element in the plurality of physical transmitting antenna elements.

2. The method of claim 1, wherein the distinct PRS sequence for a corresponding distinct physical transmitting antenna element PAP ID (h) is based on a corresponding function $f(PAP_h)$.

3. The method of claim 2, wherein the corresponding function $f(PAP_h)$ is based further on a Cell Portion ID, wherein the Cell Portion ID comprises an identifier associated with a geographic portion of the single cell.

4. The method of claim 1, wherein generating the plurality of distinct PRS sequences comprises:
   generating, for a first physical transmitting antenna element of the plurality of physical transmitting antenna elements in the single cell, a corresponding first PRS sequence, the corresponding first PRS sequence being identical to a PRS sequence associated with the single cell, wherein the plurality of distinct PRS sequences comprise the first PRS sequence.

5. The method of claim 1, wherein the plurality of physical transmitting antenna elements comprise one of:
   a Distributed Antenna System (DAS), or
   small cells, or
   transmission points, or
   a combination thereof.

6. The method of claim 1, wherein the plurality of physical transmitting antenna elements are realized using Remote Radio Heads (RRHs).

7. The method of claim 1, further comprising:
   initiating a transmission of an Observed Time Difference of Arrival (OTDOA) assistance information to a User Equipment (UE), the OTDOA assistance information comprising information pertaining to one or more distinct PRS sequences of the plurality of distinct PRS sequences.

8. The method of claim 7, wherein initiating the transmission of the OT OA assistance information comprises:
   initiating the transmission of the OTDOA assistance information in response to received information from the UE indicating a capability to receive the OTDOA assistance information comprising information pertaining to the one or more distinct PRS sequences.

9. An apparatus comprising:
   a transceiver, the transceiver capable of transmitting Positioning Reference Signal (PRS) information; and
   a processor coupled to the transceiver, the processor configured to:
      assign a distinct Physical Antenna Port (PAP) identifier (ID) to each physical transmitting antenna element in a plurality of physical transmitting antenna elements serving a single cell; and
      generate a plurality of distinct PRS sequences, each distinct PRS sequence in the plurality of distinct PRS sequences corresponding to a distinct physical transmitting antenna element in the plurality of physical transmitting antenna elements.

10. The apparatus of claim 9, wherein the distinct PRS sequence for a corresponding distinct physical transmitting antenna element PAP ID (h) is based on a corresponding function $f(PAP_h)$.

11. The apparatus of claim 10, wherein the corresponding function $f(PAP_h)$ is based further on a Cell Portion ID, wherein the Cell Portion ID comprises an identifier associated with a geographic portion of the single cell.

12. The apparatus of claim 9, wherein to generate the plurality of distinct PRS sequences, the processor is configured to:
   generate, for a first physical transmitting antenna element of the plurality of physical transmitting antenna elements in the single cell, a corresponding first PRS sequence, the corresponding first PRS sequence being identical to a PRS sequence associated with the single cell, wherein the plurality of distinct PRS sequences comprise the first PRS sequence.

13. The apparatus of claim 9, wherein the plurality of physical transmitting antenna elements comprise one of:
   a Distributed Antenna System (DAS), or
   small cells, or
   transmission points, or
   a combination thereof.

14. The apparatus of claim 9, wherein the plurality of physical transmitting antenna elements are realized using Remote Radio Heads (RRHs).

15. The apparatus of claim 9, wherein the processor is further configured to:
   initiate a transmission of an Observed Time Difference of Arrival (OTDOA) assistance information to a User Equipment (UE), the OT OA assistance information comprising information pertaining to one or more distinct PRS sequences of the plurality of distinct PRS sequences.

16. The apparatus of claim 15, wherein the processor is configured to inmate the transmission of the OTDOA assistance information in response to received information from the indicating a capability to receive the OTDOA assistance information comprising information pertaining to the one or more PRS sequences.

17. An apparatus comprising:
   transceiver means, the transceiver means capable of transmitting Positioning Reference Signal (PRS) information; and
   processing means, the processing means comprising:
      means for assigning a distinct Physical Antenna Port (PAP) identifier (ID) to each physical transmitting antenna element in a plurality of physical transmitting antenna elements serving a single cell; and
      means for generating a plurality of distinct PRS sequences, each distinct PRS sequence in the plurality of distinct PRS sequences corresponding to a distinct physical transmitting antenna element in the plurality of physical transmitting antenna elements.

18. The apparatus of claim 17, wherein the distinct PRS sequence for a corresponding distinct physical transmitting antenna element PAP ID (h) is based on a corresponding function $f(PAP_h)$.

19. The apparatus of claim 18, wherein the corresponding function $f(PAP_h)$ is based further on a Cell Portion ID, wherein the Cell Portion ID comprises an identifier associated with a geographic portion of the single cell.

20. The apparatus of claim 17, wherein means for generating the plurality of distinct PRS sequences comprises:
   means for generating, for a first physical transmitting antenna element of the plurality of physical transmitting antenna elements in the single cell, a corresponding first PRS sequence, the corresponding first PRS sequence being identical to a PRS sequence associated with the single cell, wherein the plurality of distinct PRS sequences comprise the first PRS sequence.

21. The apparatus of claim 17, wherein, the plurality of physical transmitting antenna elements comprise one of:
   a Distributed Antenna System (DAS), or
   small cells, or
   transmission points, or
   a combination thereof.

22. The apparatus of claim 17, wherein the plurality of physical transmitting antenna elements are realized using Remote Radio Heads (RRHs).

23. The apparatus of claim 17, Wherein the processing means further comprises:
   means for initiating a transmission of an Observed Time Difference of Arrival (OTDOA) assistance information to a User Equipment (UE), the OTDOA assistance information comprising information pertaining to one or more distinct PRS sequences of the plurality of distinct PRS sequences.

24. An article comprising:
   a non-transitory computer readable medium comprising instructions to that are executable by a processor to:
      assign a distinct Physical Antenna Port (PAP) identifier (ID) to each physical transmitting antenna element in a plurality of physical transmitting antenna elements serving a single cell; and
      generate a plurality of distinct PRS sequences, each distinct PRS sequence in the plurality of distinct PRS sequences corresponding to a distinct physical transmitting antenna element in the plurality of physical transmitting antenna elements.

25. The computer-readable medium of claim 24, wherein the distinct PRS sequence for a corresponding distinct physical transmitting antenna element PAP ID (h) is based on a corresponding function $f(PAP_h)$.

26. The computer-readable medium of claim 25, wherein the corresponding function $f(PAP_h)$ is based further on a Cell Portion ID, wherein the Cell Portion ID comprises an identifier associated with a geographic portion of the single cell.

27. The computer-readable medium of claim 24, wherein to generate the plurality of distinct PRS sequences, the processor is configured to:
   generate, for a first physical transmitting antenna element of the plurality of physical transmitting antenna elements in the single cell, a corresponding first PRS sequence, the corresponding first PRS sequence being identical to a PRS sequence associated with the single cell, wherein the plurality of distinct PRS sequences comprise the first PRS sequence.

28. The computer-readable medium of claim 24, wherein the plurality of physical transmitting antenna elements comprise one of:
   a Distributed Antenna System (DAS), or
   small cells, or
   transmission points, or
   a combination thereof.

29. The computer-readable medium of claim 24, wherein the plurality of physical transmitting antenna elements are realized using Remote Radio Heads (RRHs).

30. The computer-readable medium of claim 24, wherein the instructions executable by the processor further comprise instructions to:
   initiate a transmission of an Observed Time Difference of Arrival (OTDOA) assistance information to a User Equipment (UE), the OTDOA assistance information comprising information pertaining to one or more distinct PRS sequences of the plurality of distinct PRS sequences.

* * * * *